(12) United States Patent
Hata et al.

(10) Patent No.: US 10,759,413 B2
(45) Date of Patent: Sep. 1, 2020

(54) CONTROL SYSTEM FOR HYBRID VEHICLE

(71) Applicant: Toyota Jidosha Kabushiki Kaisha, Toyota-shi (JP)

(72) Inventors: Kensei Hata, Sunto-gun (JP); Akira Murakami, Gotemba (JP); Hideaki Komada, Gotemba (JP); Tatsuya Imamura, Okazaki (JP); Takahito Endo, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 255 days.

(21) Appl. No.: 15/875,024

(22) Filed: Jan. 19, 2018

(65) Prior Publication Data

US 2018/0208177 A1    Jul. 26, 2018

(30) Foreign Application Priority Data

Jan. 23, 2017  (JP) ................................. 2017-009616

(51) Int. Cl.
*B60L 9/00* (2019.01)
*G05D 1/00* (2006.01)
(Continued)

(52) U.S. Cl.
CPC ............. *B60W 20/19* (2016.01); *B60K 6/365* (2013.01); *B60K 6/445* (2013.01); *B60W 10/06* (2013.01);
(Continued)

(58) Field of Classification Search
CPC ...... B60W 20/19; B60W 10/06; B60W 20/10; B60W 10/08; B60W 20/00; B60K 6/365; B60K 6/445; F16H 3/727; F16H 48/10
(Continued)

(56) References Cited

U.S. PATENT DOCUMENTS 8,512,189 B2    8/2013  Holmes et al.
2006/0011395 A1  1/2006  Sugiyama et al.
2013/0030625 A1* 1/2013  Park ..................... B60W 10/06
                                          701/22

FOREIGN PATENT DOCUMENTS

JP       2001-309507 A    11/2001
JP       2005-6406 A      1/2005
(Continued)

OTHER PUBLICATIONS

English Translation for JP2005006406A.*

*Primary Examiner* — Mahmoud S Ismail

(74) *Attorney, Agent, or Firm* — Oblon, McClelland, Maier & Neustadt, L.L.P.

(57) ABSTRACT

A control system for hybrid vehicles to eliminate the shortage of drive force within the low-to-mid speed range in the hybrid mode. In a differential mechanism, a first rotary element is connected to an engine, a second rotary element is connected to a first motor, a third rotary element is connected to a second motor, and a fourth rotary element is connected to an output unit. A third motor is connected to the output unit. When the controller determines that the hybrid vehicle is propelled by the torque of the engine, the first motor and the second motor generate torques in a same direction as an engine torque to propel the vehicle in a forward direction, and the third motor generates a torque in the forward direction to propel the vehicle together with the engine torque.

8 Claims, 20 Drawing Sheets

(51) Int. Cl.
*G05D 3/00* (2006.01)
*G06F 7/00* (2006.01)
*G06F 17/00* (2019.01)
*B60W 20/19* (2016.01)
*B60K 6/445* (2007.10)
*B60W 10/06* (2006.01)
*B60W 10/08* (2006.01)
*F16H 3/72* (2006.01)
*B60W 20/10* (2016.01)
*B60K 6/365* (2007.10)
*F16H 48/10* (2012.01)

(52) U.S. Cl.
CPC ............ *B60W 10/08* (2013.01); *B60W 20/10* (2013.01); *F16H 3/727* (2013.01); *F16H 48/10* (2013.01); *B60W 2510/0657* (2013.01); *B60W 2710/083* (2013.01); *B60Y 2200/92* (2013.01); *F16H 2048/104* (2013.01); *F16H 2048/106* (2013.01); *F16H 2200/201* (2013.01); *F16H 2200/2005* (2013.01); *F16H 2200/2007* (2013.01); *F16H 2200/2023* (2013.01); *Y02T 10/6239* (2013.01); *Y02T 10/7258* (2013.01); *Y10S 903/905* (2013.01); *Y10S 903/906* (2013.01)

(58) Field of Classification Search
USPC .......................................................... 701/22
See application file for complete search history.

(56) References Cited

FOREIGN PATENT DOCUMENTS

| | | | |
|---|---|---|---|
| JP | 2005006406 A | * | 1/2005 |
| JP | 2005-90867 A | | 4/2005 |
| JP | 2005-138802 A | | 6/2005 |
| JP | 2005-143285 A | | 6/2005 |
| JP | 2007-237885 A | | 9/2007 |
| JP | 4069901 | | 4/2008 |

* cited by examiner

CONTROL SYSTEM FOR HYBRID VEHICLE

CROSS REFERENCE TO RELATED APPLICATIONS

The present disclosure claims the benefit of Japanese Patent Application No. 2017-009616 filed on Jan. 23, 2017 with the Japanese Patent Office, the disclosure of which are incorporated herein by reference in its entirety.

BACKGROUND

Field of the Disclosure

Embodiments of the present disclosure relate to the art of a control system for a hybrid vehicle in which a prime mover includes an engine and at least three motors.

Discussion of the Related Art

US2006/011395 A1 describes a hybrid vehicle in which a prime mover includes an engine and three motor-generators. The hybrid vehicle taught by US2006/011395 A1 comprises a power split device including two sets of planetary gear mechanisms. The power split device thus structured preforms a differential action among four rotary elements. In the power split device, a first rotary element is connected to engine, a second rotary element is connected to a first motor, a third rotary element is connected to a second motor, and a fourth rotary element is connected to drive wheels through a differential unit connected to a third motor. According to the teachings of US2006/011395 A1, a speed ratio between the first rotary element and the fourth rotary element may be varied continuously by manipulating the first motor and the second motor. In the hybrid vehicle taught by US2006/011395 A1, any one of the motors whose expected output is smaller than that of the other one is used to establish a reaction force against an engine torque, and resultant electricity is supplied to the third motor.

U.S. Pat. No. 8,512,189 also describes a hybrid vehicle comprising an engine and three motors. According to the teachings of U.S. Pat. No. 8,512,189, an operating mode of the hybrid vehicle may be selected from a compound-split mode, an input-split mode, a launch mode, and an all-wheel drive mode, and the engine is operated in those operating modes. In the compound-split mode, one of the first motor and the second motor serves as a generator to rotate the first drive axle, and the other motor serves as a prime mover. In the input-split mode, one of the first motor and the second motor serves as a generator, and the third motor serves as a prime mover to drive a second drive axle. In the launch mode, one of the first motor and the second motor serves as a generator, the other motor functions as a prime mover to generate torque to prevent the first drive axle from being rotated by an engine torque, and the third motor is operated as a motor by the electricity generated by the motor serving as a generator to launch the hybrid vehicle. In the all-wheel drive mode, one of the first motor and the second motor serves as a generator, and the other motor and the third motor individually serve as a prime mover to rotate the first drive axle and the second drive axle respectively.

According to the teachings of the foregoing prior art documents, an increase in an engine speed may be restricted by an upper limit speed of the motor and an upper limit speed of a pinion of the planetary gear unit. In other words, a maximum torque of the engine may be restricted by those restriction factors. For example, in the hybrid vehicle taught by US2006/011395 A1, the first motor is connected to the power split device to control a speed of the engine connected to the power split device. To this end, the maximum torque of the motor is set to a value possible to establish a reaction force e against the engine. That is, if the maximum torque of the engine is small, the maximum torque of the motor is set to a smaller value. Consequently, shortage of a drive force for propelling the vehicle may be caused within a low-to-mid speed range in spite of activating the engine.

Thus, US2006/011395 A1 discloses techniques of downsizing of the motor and avoiding occurrence of power circulation. On the other hand, U.S. Pat. No. 8,512,189 discloses techniques of selecting the operating mode in such a manner as to improve fuel efficiency. However, the conventional hybrid vehicles have to be improved to eliminate the shortage of drive force within a low-to-mid speed range during propulsion while activating the engine.

SUMMARY

Aspects of embodiments of the present disclosure have been conceived noting the foregoing technical problems, and it is therefore an object of the present disclosure is to provide a control system that is applied to a hybrid vehicle including an engine and at least three motors to improve performance of the vehicle thereby eliminating the shortage of drive force within the low-to-mid speed range.

The control system according to the embodiments of the present disclosure relates to a control system for a hybrid vehicle, comprising: a prime mover including an engine and at least three motors; a differential mechanism that performs a differential rotation among at least four rotary elements; an output unit that delivers power to drive wheels; and a controller that controls the prime mover. In the hybrid vehicle, the engine is connected to a first rotary element of the differential mechanism, a first motor of the prime mover is connected to a second rotary element of the differential mechanism, a second motor of the prime mover is connected to a third rotary element of the differential mechanism, the output unit is connected to a fourth rotary element of the differential mechanism, and a third motor of the prime mover is connected to the output unit that is connected to the fourth rotary element or another output unit that is not connected to the fourth rotary element. In order to achieve the above-explained objective, according to the embodiment, the controller is configured to: determine an operating condition of the hybrid vehicle; and control the first motor and the second motor in such a manner as to generate torques in a same direction as a torque of the engine to propel the hybrid vehicle in a forward direction, and control the third motor in such a manner as to generate a torque in the forward direction to propel the vehicle together with the torque of the engine, when the controller determines that the hybrid vehicle is propelled by the torque of the engine.

In a non-limiting embodiment, the controller may be further configured to: compare a required drive force to propel the hybrid vehicle with a threshold value; and control the first motor and the second motor in such a manner as to generate the torques in the same direction as the torque of the engine to propel the vehicle in the forward direction, and control the third motor in such a manner as to generate the torque in the forward direction to propel the vehicle together with the torque of the engine, when the required drive force is greater than the threshold value.

In a non-limiting embodiment, when generating the torques by the first motor and the second motor in the same direction as a torque of the engine to propel the hybrid vehicle in a forward direction, the controller may control the first motor in such a manner as to generate a torque in the same direction as the torque of the engine to rotate the second rotary element, and control the second motor in such a manner as to generate a torque in the same direction as the torque of the engine to rotate the third rotary element. Instead, the controller may control the first motor in such a manner as to generate a torque to rotate the second rotary element in the same direction as the torque of the engine, and control the second motor in such a manner as to generate a torque in an opposite direction to the torque of the engine to brake the third rotary element. Further, the controller may control the second motor in such a manner as to generate a torque in the same direction as the torque of the engine to rotate the third rotary element, and control the first motor in such a manner as to generate a torque in the opposite direction to the torque of the engine to brake the second rotary element.

In a non-limiting embodiment, the controller may be further configured to control the first motor, the second motor, and the third motor in such a manner as to serve individually as a motor.

In a non-limiting embodiment, the controller may be further configured to: compare an upper limit value of the torque possible to be generated by the engine with a designed maximum torque of the engine; and control one of the first motor and the second motor in such a manner as to increase an output torque of the other one of the first motor and the second motor, when the upper limit value of the torque generated by the engine is smaller than the designed maximum torque of the engine.

In a non-limiting embodiment, the controller may be further configured to control the first motor, the second motor, and the third motor in such a manner as to maximize a total force of: a drive force generated by the torque delivered from the fourth rotary element to the output unit; and a drive force generated by the torque delivered from the third motor 4 to the output unit.

In a non-limiting embodiment, the differential mechanism may include: a first planetary gear unit including a first sun gear, a first carrier, and a first ring gear; and a second planetary gear unit including a second sun gear, a second carrier, and a second ring gear. In the differential mechanism, the first sun gear and the second sun gear are connected to each other, the first ring gear and the second carrier are connected to each other, the first carrier is connected to the engine to serve as the first rotary element, the first sun gear or the second sun gear is connected to the first motor to serve as the second rotary element, the second ring gear is connected to the second motor to serve as the third rotary element, and the first ring gear or the second carrier is connected to the output unit to serve as the fourth rotary element.

In a non-limiting embodiment, the differential mechanism may include: a first planetary gear unit including a first sun gear, a first carrier, and a first ring gear; and a second planetary gear unit including a second sun gear, a second carrier, and a second ring gear. In the differential mechanism, the first carrier and the second ring gear are connected to each other, the first ring gear and the second carrier are connected to each other, the first ring gear or the second carrier is connected to the engine to serve as the first rotary element, the second sun gear is connected to the first motor to serve as the second rotary element, the first sun gear is connected to the second motor to serve as the third rotary element, and the first carrier or the second ring gear is connected to the output unit to serve as the fourth rotary element.

Thus, according to the embodiment of the present disclosure, all of the first motor, the second motor, and the third motor generates the torques in the same direction as the engine torque when propel the vehicle by the engine. Specifically, the first motor and the second motor are controlled in such a manner as to generate the torques in a same direction as the engine torque to be applied to the first rotary element to propel the hybrid vehicle in a forward direction, and the third motor is controlled in such a manner as to generate a torque in the forward direction to propel the vehicle together with the torque of the engine. According to the embodiment of the present disclosure, therefore, the drive force to propel the vehicle can be assisted by the first motor, the second motor, and the third motor even when the engine is not allowed to generate the maximum torque. For this reason, the drive force may be ensured when launching or accelerating the vehicle, or during forward propulsion within the low-to-mid speed range. That is, performance of the vehicle may be improved.

In addition, the first motor, the second motor, and the third motor are operated as motors to generate the torques in the same direction as the engine torque by controlling the speeds of those motors. According to the embodiment of the present disclosure, therefore, a battery power may be utilized efficiently without generating electricity by the first motor and the second motor when assisting the drive force by the motor torques. For this reason, energy efficiency of the hybrid vehicle may be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
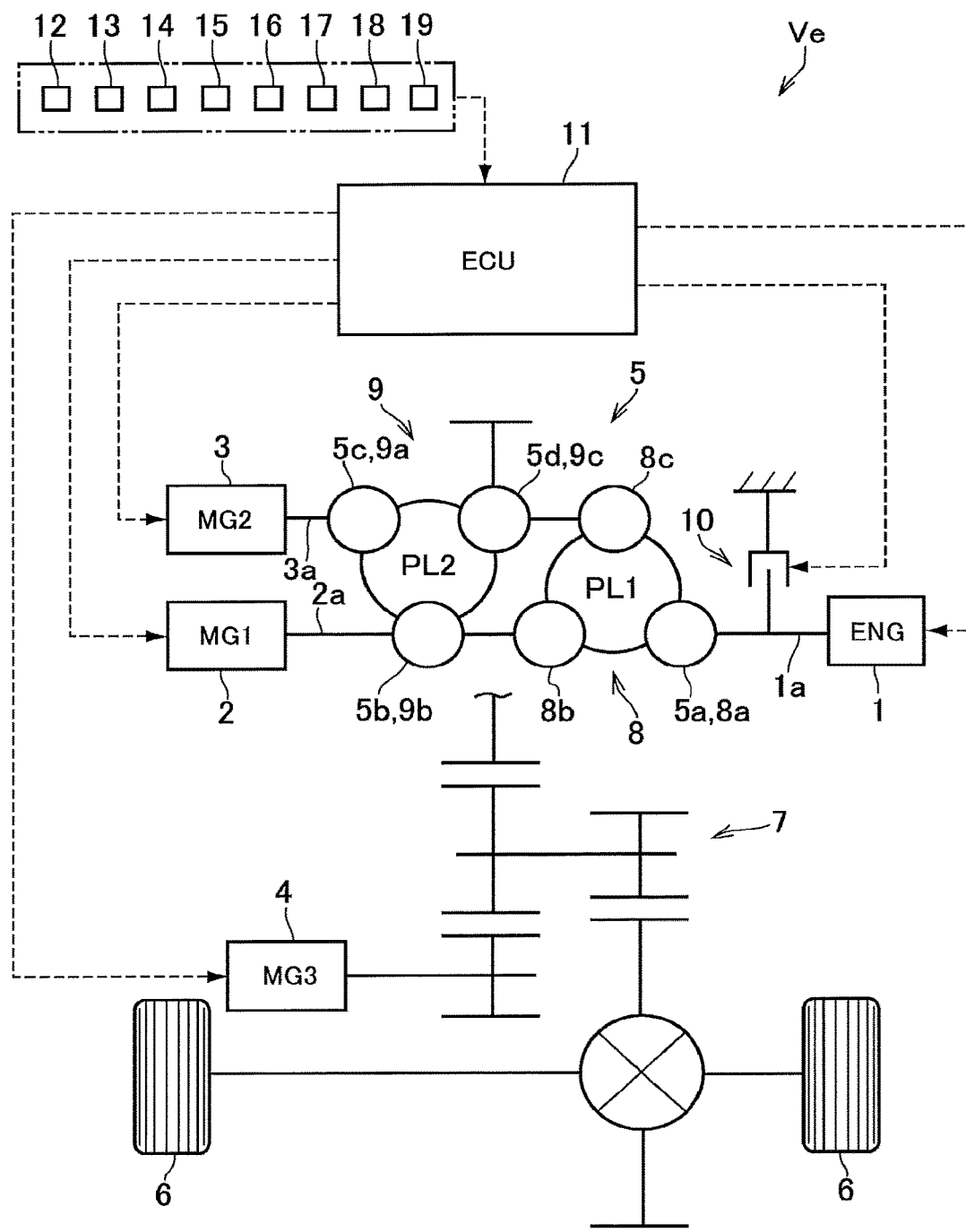
FIG. 1 is a schematic illustration showing an example of a drive system of the hybrid vehicle to which the control system according to the embodiment is applied.

Preferred embodiments of the present disclosure will now be explained with reference to the accompanying drawings. Referring now to FIG. 1, there is schematically shown an example of a structure of a hybrid vehicle (as will be simply called the "vehicle" hereinafter) Ve to which the control system according to the embodiment is applied. The vehicle Ve comprises a differential mechanism adapted to perform a differential action among four rotary elements, and an output unit to deliver power to any of a pair of front wheels and a pair of rear wheels.

As shown in FIG. 1, a prime mover of the vehicle Ve includes an engine (referred to as "ENG" in FIG. 1) 1, a first motor (referred to as "MG1" in FIG. 1) 2, a second motor (referred to as "MG2" in FIG. 1) 3, and a third motor (referred to as "MG3" in FIG. 1) 4. The vehicle Ve further comprises a differential mechanism 5 serving as a power split device, and an output unit 7 that delivers power to drive wheels 6.

For example, an internal combustion engine such as a gasoline engine and a diesel engine may be used as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled electrically.

A permanent magnet type synchronous motor or an induction motor having a generating function, that is, a motor-generator may be used individually as the first motor 2, the second motor 3, and the third motor 4. The first motor 2, the second motor 3, and the third motor 4 are individually connected to a power source controller (not shown) including a battery and an inverter so that rotational speeds and torques thereof are controlled electrically. In addition, the first motor 2, the second motor 3, and the third motor 4 may also be operated by the selectively as a motor and a generator. In the vehicle Ve shown in FIG. 1, therefore, an electric power generated by the first motor 2 or the second motor 3 can be supplied to the third motor 4 to operate the third motor 4 as a motor.

The differential mechanism 5 is adapted to perform a differential action among a first rotary element 5a, a second rotary element 5b, a third rotary element 5c and a fourth rotary element 5d. Specifically, the first rotary element 5a is connected to the engine 1, the second rotary element 5b is connected to the first motor 2, the third rotary element 5c is connected to the second motor 3, and the fourth rotary element 5d is connected to the output unit 7.

The differential mechanism 5 includes a first planetary gear unit (referred to as "PL1" in FIG. 1) 8, and a second planetary gear unit (referred to as "PL2" in FIG. 1) 9. The first planetary gear unit 8 includes a first input element 8a, a first reaction element 8b and a first output element 8c. Likewise, the second planetary gear unit 9 includes a second input element 9a, a second reaction element 9b and a second output element 9c. The first reaction element 8b and the second reaction element 9b are connected to each other, and the first output element 8c and the second output element 9c are connected to each other.

In the differential mechanism 5, an output shaft 1a of the engine 1 is connected to the first input element 8a, an output shaft 2a of the first motor 2 is connected to the first reaction element 8b and the second reaction element 9b, and an output shaft 3a of the second motor 3 is connected to the second input element 9a. The output unit 7 is connected to the first output element 8c and the second output element 9c, and also connected to the drive wheels 6 to deliver power to the drive wheels 6.

That is, in the differential mechanism 5, the first input element 8a connected to the engine 1 serves as the first rotary element 5a, the first reaction element 8b and the second reaction element 9b connected to the first motor 2 serve as the second rotary element 5b, the second input element 9a connected to the second motor 3 serves as the third rotary element 5c, and the first output element 8c and the second output element 9c connected to the output unit 7 serve as the fourth rotary element 5d.

Thus, the vehicle Ve according to the embodiment of the present disclosure is provided with the "output unit" to deliver power to the drive wheels 6. Specifically, given that any one of the pairs of the front wheels and the rear wheels serve as the drive wheels, the output unit is arranged to deliver power to said one of the pairs of the front wheels and the rear wheels serving as the drive wheels. By contrast, given that both pairs of the front wheels and the rear wheels serve as the drive wheels, two output units are arranged to deliver power to each of the pairs of the front wheels and the rear wheels. In the example shown in FIG. 1, the output unit 7 is interposed between the fourth rotary element 5d of the differential mechanism 5 and the front wheels serving as the drive wheels 6.

The third motor 4 is also connected to the output unit 7. In the vehicle shown in FIG. 1, therefore, the drive wheels 6 can be rotated not only by torque delivered from the fourth rotary element 5d of the differential mechanism 5 to the output unit 7, but also by torque delivered from the third motor 4 to the output unit 7.

A rotation of the output shaft 1a of the engine 1 connected to the first input element 8a may be stopped selectively by a brake 10. In the vehicle Ve, the first input element 8a is allowed to serve as a reaction element of the first planetary gear unit 8 to deliver output torque of the first motor 2 to the output unit 7 by applying the brake 10. In this case, the vehicle Ve may be propelled while stopping the engine 1, by torque of one of the first motor 2 and the second motor 3 and torque of the third motor 4, or by torques of the first motor 2, the second motor 3, and the third motor 4.

In order to control the engine 1, the first motor 2, the second motor 3 and the third motor 4, the vehicle Ve is further provided with a controller (referred to as "ECU" in FIG. 1) 11 composed mainly of a microcomputer.

For example, the controller 11 receives detection signals from a vehicle speed sensor 12 that detects a speed of the vehicle Ve, an accelerator sensor 13 that detects a position or a speed of depressing an accelerator pedal, an engine speed sensor 14 that detects a speed of the engine 1, a first motor speed sensor (or a resolver) 15 that detects a speed of the first motor 2, a second motor speed sensor (or a resolver) 16 that detects a speed of the second motor 3, a third motor speed sensor (or a resolver) 17 that detects a speed of the third motor 4, a battery sensor 18 that detects a state of charge (to be abbreviated as "SOC" hereinafter) level of the battery, and a shift position sensor 19 that detects a position of a shift lever or a shift switch. The controller 11 is configured to carry out a calculation based on incident data and data and formulas installed in advance, and to transmit calculation results in the form of command signals to the components of the vehicle Ve.

Figure 2:
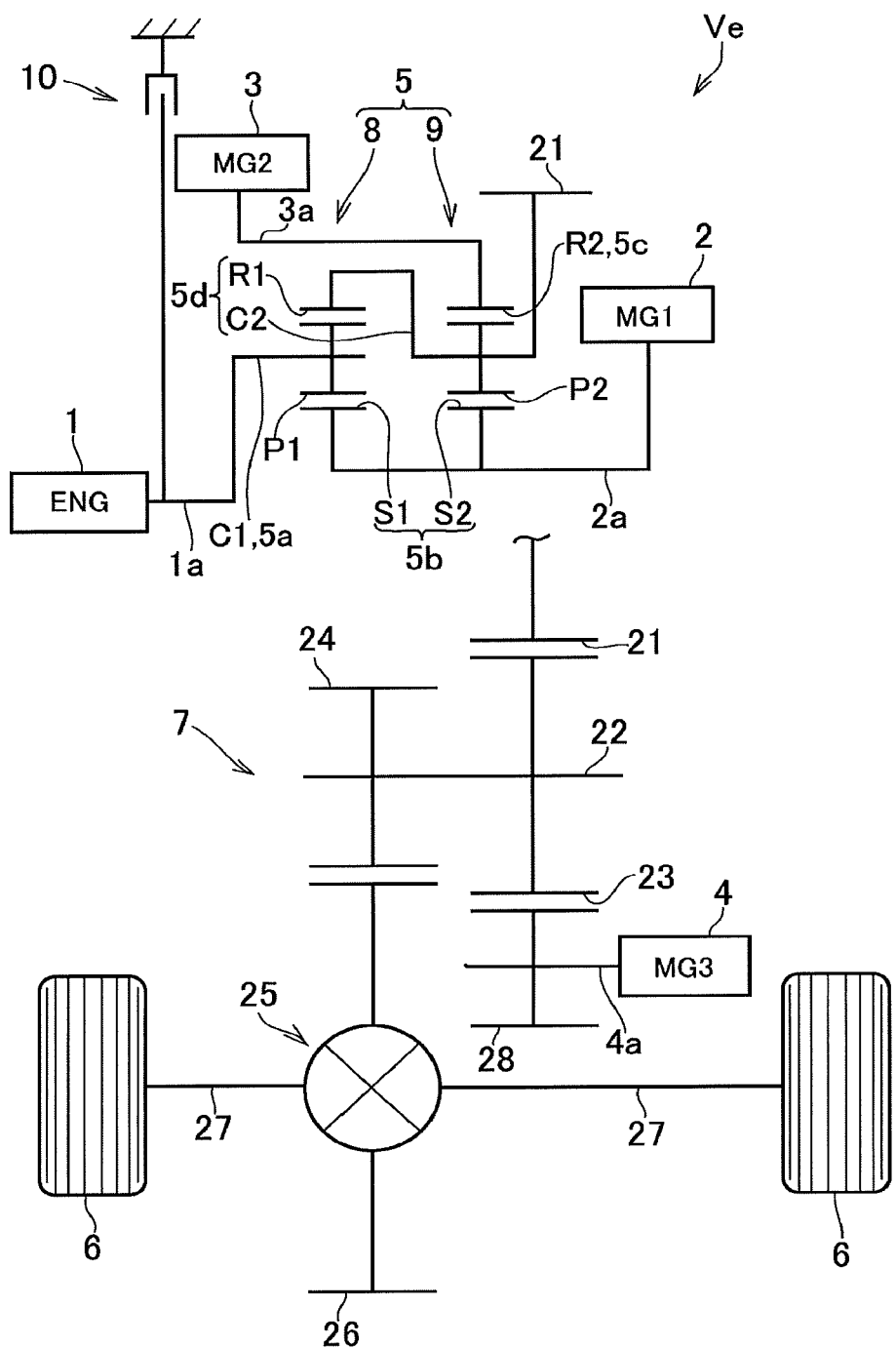
FIG. 2 is a schematic illustration showing a first example of a gear train of the hybrid vehicle.

Turning to FIG. 2, there is shown a first example of a gear train of the vehicle Ve. The gear train shown in FIG. 2 is adapted to be used as a transaxle in FF (front-engine/front-wheel drive) layout vehicles, RR (rear engine/rear wheel drive) layout vehicles, and MR (mid-engine/rear drive) layout vehicles.

In the gear train shown in FIG. 2, the first planetary gear unit 8 and the second planetary gear unit 9 are arranged coaxially with the output shaft 1a of the engine 1, and the rotary elements of the first planetary gear unit 8 and the rotary elements of the second planetary gear unit 9 are connected to each other to form the differential mechanism 5 as a complex planetary gear unit. The first planetary gear unit 8 is a single-pinion planetary gear unit including a first sun gear S1, a first ring gear R1, and a first carrier C1. In the first planetary gear unit 8, specifically, the first sun gear S1 as an external gear is arranged coaxially with the output shaft 1a of the engine 1, the first ring gear R1 as an internal gear is arranged coaxially around the first sun gear S1, and the first carrier C1 supports a plurality of first pinion gears P1 interposed between the first sun gear S1 and the first ring gear R1 in a rotatable manner.

The second planetary gear unit 9 is also a single-pinion planetary gear unit including a second sun gear S2, a second ring gear R2, and a second carrier C2. In the second planetary gear unit 9, specifically, the second sun gear S2 as an external gear is arranged coaxially with the output shaft 1a of the engine 1, the second ring gear R2 as an internal gear is arranged coaxially around the second sun gear S2, and the second carrier C2 supports a plurality of second pinion gears P2 interposed between the second sun gear S2 and the second ring gear R2 in a rotatable manner.

In the differential mechanism 5, the first carrier C1 is connected to the output shaft 1a of the engine 1, the sun gear S1 and the second sun gear S2 are connected to the output shaft 2a of the first motor 2, the second ring gear R2 is connected to an output shaft 3a of the second motor 3, and the first ring gear R1 and the second carrier C2 are connected to the output unit 7. According to the first example shown in FIG. 2, the output unit 7 includes a drive gear 21, a countershaft 22, a counter driven gear 23, a final drive gear 24, and a differential gear unit 25, and an output torque of the output unit 7 is delivered to the drive wheels 6 through each driveshaft 27.

In the first planetary gear unit 8, accordingly, the first carrier C1 serves as the first input element 8a, the first sun gear S1 serves as the first reaction element 8b, and the first ring gear R1 serves as the first output element 8c. On the other hand, in the second planetary gear unit 9, the second ring gear R2 serves as the second input element 9a, the second sun gear S2 serves as the second reaction element 9b, and the second carrier C2 serves as the second output element 9c. Accordingly, in the differential mechanism 5, the first carrier C1 serves as the first rotary element 5a, the first sun gear S1 and the second sun gear S2 serve as the second rotary element 5b, the second ring gear R2 serves as the third rotary element 5c, and the first ring gear R1 and the second carrier C2 serve as the fourth rotary element 5d.

Optionally, a gear unit may be interposed between the first carrier C1 of the first planetary gear unit 8 and the output shaft 1a of the engine 1. Instead, a damper device or a torque converter (neither of which are shown) may also be interposed between the first carrier C1 of the first planetary gear unit 8 and the output shaft 1a of the engine 1.

The drive gear 21 is formed around the second carrier C2 to be rotated integrally therewith, and a countershaft 22 is arranged in parallel with the output shaft 1a of the engine 1. A counter driven gear 23 is fitted onto one of end portions of the countershaft 22 (i.e., in the right side in FIG. 2) while being meshed with the drive gear 21, and a final drive gear 24 is fitted onto the other end portion of the countershaft 22 (i.e., in the left side in FIG. 2) while being meshed with a final driven gear (i.e., a differential ring gear) 26 of a differential gear unit 25 as a final reduction. The differential gear unit 25 is connected to each of the drive wheels 6 through each of the driveshafts 27.

Thus, the drive gear 21, the countershaft 22, the counter driven gear 23, the final drive gear 24, and the differential gear unit 25 form the output unit 7, and torque delivered to the output unit 7 from the second carrier C2 is further delivered to the drive wheels 6 through the driveshafts 27.

Torque of the third motor 4 may be added to torque transmitted from the differential mechanism 5 to the drive wheels 6. To this end, an output shaft 4a of the third motor 4 is arranged parallel to the countershaft 22, and a pinion 28 is fitted onto a leading end (i.e., in the left side in FIG. 2) of the output shaft 4a while being meshed with the counter driven gear 23. Thus, not only the second carrier C2 but also the third motor 4 are connected to the drive wheels 6 through the output unit 7.

A rotation of the first carrier C1 connected to the output shaft 1a of the engine 1 is selectively stopped by a brake 10. Specifically, the brake 10 is engaged to apply a reaction force to the first carrier C1 when the first motor 2 is operated as a motor while stopping the engine 1 to generate the drive force. In this situation, the reaction force resulting from rotating the first motor 2 in a counter direction (opposite to a rotational direction of the engine 1) by supplying electricity thereto is received by a predetermined stationary member such as a casing to which the brake 10 is fixed. Consequently, the vehicle Ve is powered by the first motor 2 while stopping the engine 1. Instead, the vehicle Ve may also be powered by the first motor 2 and the second motor 3, or by the first motor 2, the second motor 3, and the third motor 4.

For example, a friction clutch such as a wet-type multiple disc clutch, and a dog clutch may be used as the brake 10. In addition, a one-way clutch may also be used as the brake 10 to stop the counter rotation of the carrier first C1.

Thus, in the vehicle Ve, a speed of the engine 1 may be changed by controlling the first motor 2, the second motor 3, and the third motor 4 by the ECU 11 without manipulating the clutch and the brake. In addition, an operating mode of the vehicle Ve may also be shifted among a plurality of modes without manipulating the clutch and the brake.

In the vehicle Ve shown in FIG. 2, a motor mode in which the engine 1 is stopped may be selected from a first motor mode in which the vehicle Ve is powered at least by the third motor 4, a second motor mode in which the vehicle Ve is powered by the first motor 2 and the third motor 4, a third motor mode in which the vehicle Ve is powered by the second motor 3 and the third motor 4, and a fourth motor mode in which the vehicle Ve is powered by the first motor 2, the second motor 3, and the third motor 4.

On the other hand, in a hybrid mode, the vehicle Ve is powered at least by the engine 1. For example, in the hybrid mode, the vehicle Ve may be propelled in an overdrive mode in which a speed of the fourth rotary element 5d connected to the output unit 7 is increased higher than a speed of the first rotary element 5a connected to the engine 1 by the torques of the engine 1, the first motor 2, and the third motor 4. In the hybrid mode, the vehicle Ve may also be propelled in an underdrive mode in which the speed of the fourth rotary element 5d is reduced lower than the speed of the first rotary element 5a by the torques of the engine 1, the second motor 3, and the third motor 4. In addition, in the hybrid mode, a speed of the engine 1 may be changed arbitrarily by the torques of the engine 1, the first motor 2, and the second motor 3.

Thus, in the hybrid mode, the vehicle Ve may be powered by all of the prime movers such as the engine 1, the first motor 2, the second motor 3, and the third motor 4. As described, in the conventional hybrid vehicles having an engine and three motors, the drive force may be restricted by the upper limit speeds of the motors and rotary members during propulsion while activating the engine. In order to overcome the shortage of the drive force in the hybrid mode, the controller 11 is configured to propel the vehicle Ve by torques of all of the prime movers such as the engine 1, the first motor 2, the second motor 3, and the third motor 4. Specifically, the controller 11 is configured to propel the vehicle Ve by operating the first motor 2, the second motor 3, and the third motor 4 in such a manner as to generate torques in a same direction as a torque of the engine 1. More specifically, the first motor 2 and the second motor 3 are operated in such a manner as to apply torques to the first rotary element 5a in the same direction as a torque of the engine 1 to propel the vehicle Ve in the forward direction, and the third motor 4 is operated in such a manner as to generate a torque to propel the vehicle Ve in the forward direction together with the torque of the engine 1.

Figure 3:
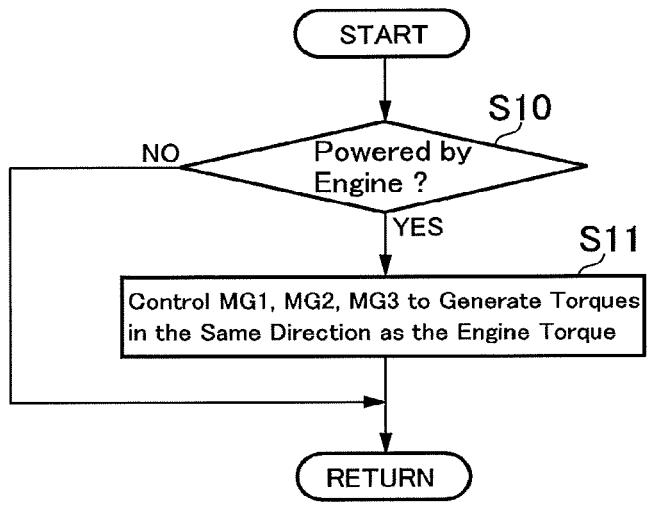
FIG. 3 is a flowchart showing a first example of a routine executed by the control system.

An example of such control to overcome the shortage of the drive force in the hybrid mode is shown in FIG. 3.

First Control Example

At step S10, it is determined whether or not the vehicle Ve is currently propelled or launched while activating the engine 1. Specifically, the controller 11 determines that the vehicle Ve is currently propelled or launched while activating the engine 1 in a case that the vehicle Ve is propelled or launched in the hybrid mode by the drive torque generated by the engine 1 in the forward direction.

If the vehicle Ve is propelled without activating the engine 1 or the vehicle Ve is stopping so that the answer of step S10 is NO, the routine returns without carrying out subsequent controls. By contrast, if the vehicle Ve is currently propelled or launched by the engine 1 so that the answer of step S10 is YES, the routine progresses to step S11.

At step S11, specifically, the first motor 2, the second motor 3, and the third motor 4 are controlled in such a manner as to generate torques in a same direction as a torque of the engine 1. Specifically, the first motor 2 and the second motor 3 are operated in such a manner as to apply torques to the first rotary element 5a in the same direction as the torque of the engine 1 to propel the vehicle Ve in the forward direction. At the same time, the third motor 4 is operated in such a manner as to generate a torque to propel the vehicle Ve in the forward direction together with the torque generated by the engine 1.

Figure 4:
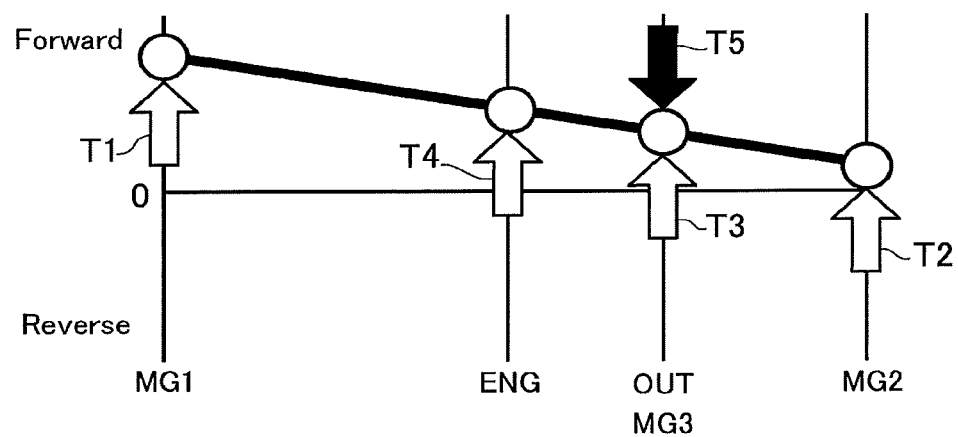
FIG. 4 is a nomographic diagram showing a situation in which all of the motors serve as a motor during execution of the routine shown in FIG. 3.
Figure 5A:
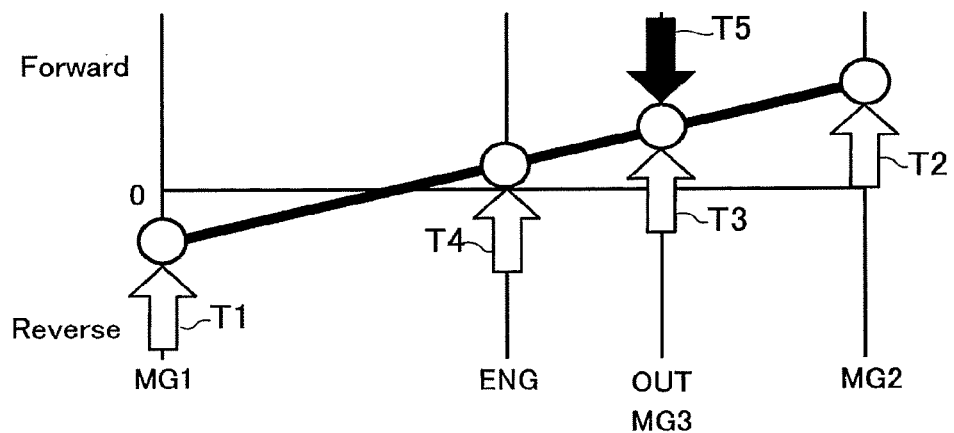
FIGS. 5a and 5b are nomographic diagrams showing a situation in which the first motor serves as a generator and the second motor and the third motor serve as a motor during execution of the routine shown in FIG. 3.
Figure 5B:
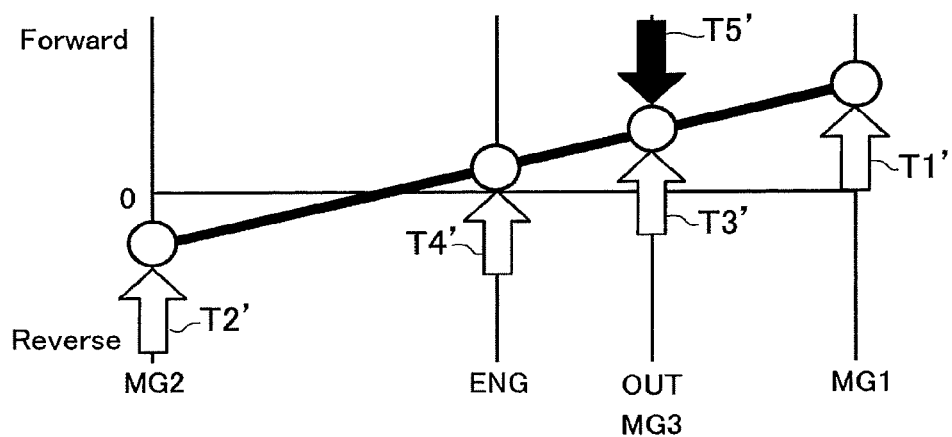

Conditions of the prime movers in this situation is shown in FIGS. 4, 5a and 5b. As shown in FIGS. 4, 5a and 5b, the first motor 2, the second motor 3, and the third motor 4 generates torques in this situation, and directions of the torques generated by the motors 2, 3, and 4 are same as the direction of the torque generated by the engine 1.

For example, the first motor 2, the second motor 3, and the third motor 4 may be controlled as indicated in FIG. 4. In the situation shown in FIG. 4, the arrow T1 representing the torque of the first motor 2, the arrow T2 representing the torque of the second motor 3, the arrow T3 representing the torque of the third motor 4, and the arrow T4 representing the torque of the engine 1 are directed in the forward direction as a rotational direction of the engine 1. That is, all of the first motor 2, the second motor 3, and the third motor 4 are rotated in the forward direction to serve as a motor thereby generating forward torques.

Instead, the first motor 2, the second motor 3, and the third motor 4 may also be controlled as indicated in FIG. 5a. In the situation shown in FIG. 5a, the arrow T1 representing the torque of the first motor 2, the arrow T2 representing the torque of the second motor 3, and the arrow T3 representing the torque of the third motor 4 are also directed upwardly as the arrow T4 representing the torque of the engine 1. In this case, the second motor 3 and the third motor 4 are rotated in the forward direction to generate the forward torques. On the other hand, the first motor 2 is rotated in the reverse direction while generating the forward torque. Thus, the second motor 3 and the third motor 4 are operated as motors, and the first motor 2 is operated as a generator.

Instead, the first motor 2, the second motor 3, and the third motor 4 may also be controlled as indicated in FIG. 5b. In the situation shown in FIG. 5b, the arrow T1' representing the torque of the first motor 2, the arrow T2' representing the torque of the second motor 3, and the arrow T3' representing the torque of the third motor 4 are also directed upwardly as the arrow T4' representing the torque of the engine 1. In this case, the first motor 2 and the third motor 4 are rotated in the forward direction to generate the forward torques. On the other hand, the second motor 3 is rotated in the reverse direction while generating the forward torque. Thus, the first motor 2 and the third motor 4 are operated as motors, and the second motor 3 is operated as a generator. In FIGS. 4, 5a and 5b, arrows T5 and T5' represent reaction forces applied to the vehicle Ve from a road surface.

After controlling the first motor 2, the second motor 3, and the third motor 4 in such a manner as to generate torques in the same direction as the engine torque, the routine returns.

Second Control Example

Figure 6:
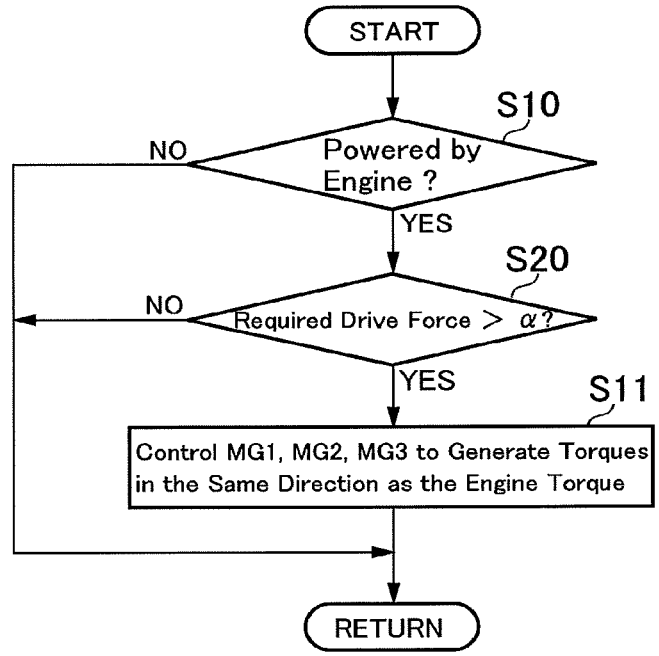
FIG. 6 is a flowchart showing a second example of a routine executed by the control system.

Thus, according to the first control example shown in FIG. 3, the drive force to propel the vehicle Ve is assisted by the torques of the first motor 2, the second motor 3, and the third motor 4 to eliminate shortage of the drive force in the hybrid mode. However, given that a required drive force is small during propulsion, it would be unnecessary to assist the drive force by all of the motors. In this case, the controller 11 is further configured to assist the drive force by all of the motors only when a large drive force is required. An example of such control is shown in FIG. 6, and in FIG. 6, common step numbers are allotted to the steps in common with those of the first example shown in FIG. 3.

If the vehicle Ve is currently propelled or launched by the engine 1 so that the answer of step S10 is YES, the routine progresses to step S20 to determine whether or not a required drive force is greater than a threshold value a. For example, the required drive force may be estimated based on a depression of an accelerator and a current vehicle speed. Specifically, the threshold value a is an upper limit value of the drive force possible to be generated only by the engine 1 without assisting by the motors 2, 3, and 4 that is determined based on a result of an experimentation or simulation.

If the required drive force is smaller than the threshold value a so that the answer of step S20 is NO, the routine returns without carrying out subsequent controls. By contrast, if the required drive force is greater than the threshold value a so that the answer of step S20 is YES, the routine progresses to step S11 to assist the drive force by the torques of all of the first motor 2, the second motor 3, and the third motor 4. Specifically, the first motor 2, the second motor 3, and the third motor 4 are controlled in such a manner as to generate torques in the same direction as the engine torque, and thereafter the routine returns.

Thus, according to the second control example, the controller 11 controls the first motor 2, the second motor 3, and the third motor 4 in such a manner as to generate torques in the same direction as the engine torque, during propulsion in the hybrid mode or when launching the vehicle Ve in the hybrid mode. Specifically, the first motor 2 and the second motor 3 are operated in such a manner as to apply torques to the first rotary element 5a in the same direction as a torque of the engine 1 to propel the vehicle Ve in the forward direction, and the third motor 4 is operated in such a manner as to generate a torque to propel the vehicle Ve in the forward direction together with the torque of the engine 1. Consequently, a rotational speed of the second rotary element 5b is changed by the torque generated by the first motor 2, in the same direction as those of the first rotary element 5a and the fourth rotary element 5d increased by the engine torque. Likewise, a rotational speed of the third rotary element 5c is changed by the torque generated by the second motor 3, in the same direction as those of the first rotary element 5a and the fourth rotary element 5d increased by the engine torque. In addition, the rotational speed of the fourth rotary element 5d is also increased by the torque generated by the third rotary element 5d.

As described, the maximum torque of the engine 1 may be restricted by the upper limit speeds of the first motor 2 and the second motor 3 connected to the differential mechanism 5, and the upper limit speeds of the first pinion gears P1 and the second first pinion gears P2 of the differential mechanism 5. In order to solve such disadvantage, the controller 11 controls the first motor 2, the second motor 3, and the third motor 4 in such a manner as to generate torques in the same direction as the engine torque thereby assisting the drive force to propel the vehicle Ve. For this reason, the drive force may be ensured even when the drive force greater than the threshold value a is required when launching or accelerating the vehicle Ve, or during forward propulsion within the low-to-mid speed range. Consequently, performance of the vehicle Ve in the hybrid mode may be improved.

Third Control Example

Figure 7:
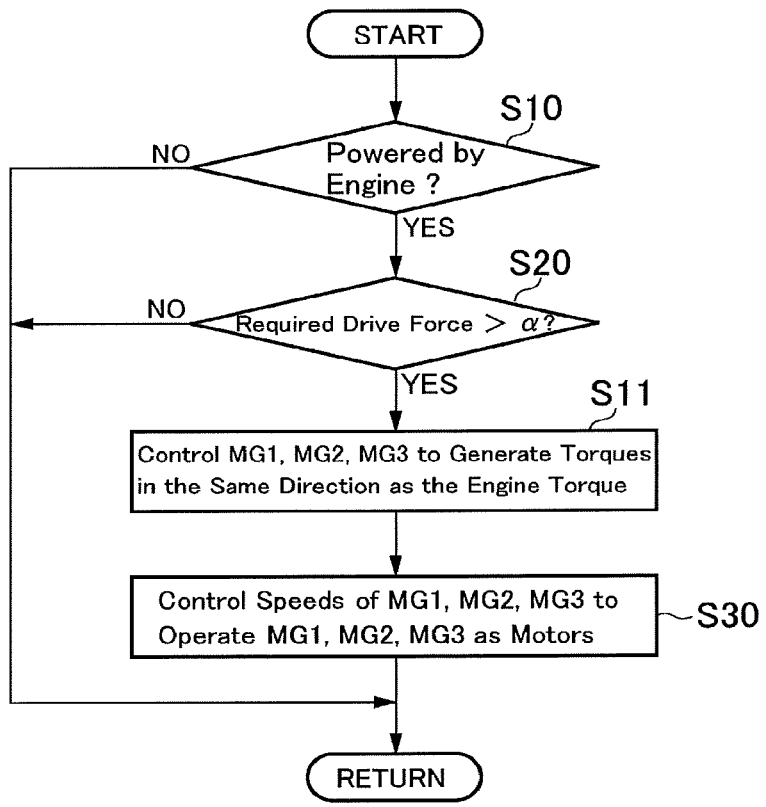
FIG. 7 is a flowchart showing a third example of a routine executed by the control system.

As shown in FIG. 7, the controller 11 is further configured to control the rotational speeds of the first motor 2, the second motor 3, and the third motor 4 in such a manner as to operate all of those motors 2, 3, and 4 as motors when assisting the drive force to propel the vehicle Ve. In FIG. 7, common step numbers are allotted to the steps in common with those of the first example shown in FIG. 3 and second example shown in FIG. 6.

According to the third control example, if the vehicle Ve is propelled or launched in the hybrid mode and the required drive force is greater than the threshold value a so that the answer of step S20 is YES, the routine progresses to step S11 to control the first motor 2, the second motor 3, and the third motor 4 in such a manner as to generate torques in the same direction as the engine torque. Thereafter, at step S30, the rotational speeds of the first motor 2, the second motor 3, and the third motor 4 are controlled in such a manner as to operate all of those motors 2, 3, and 4 as motors, as indicated in FIG. 4. Thereafter, the routine returns.

Figure 8:
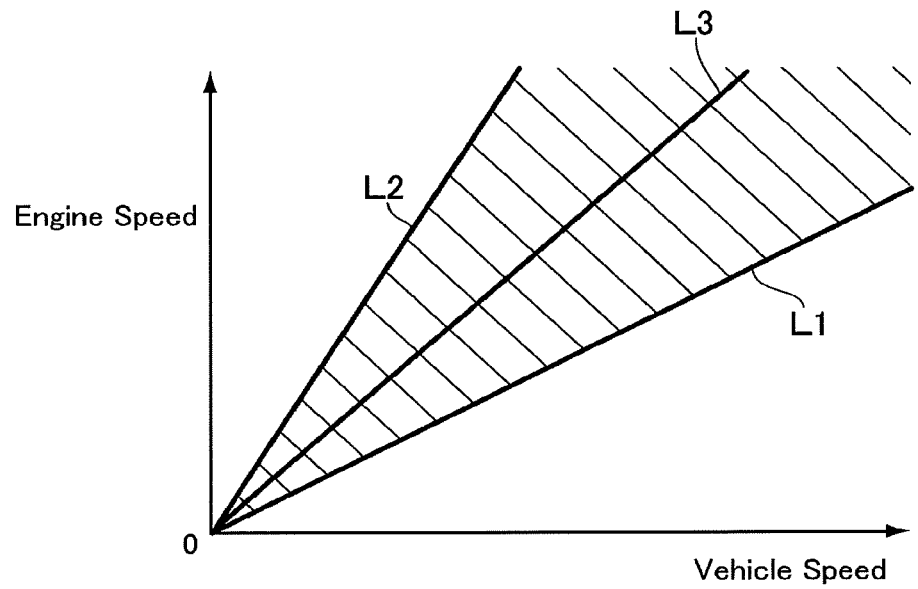
FIG. 8 is a graph showing a region where an engine speed and a vehicle speed are changed during execution of the routine shown in FIG. 7.

Such control at step S30 is executed within a range in which the speeds of the first motor 2 and the speed of the second motor 3 are faster than zero. Specifically, as indicated in FIG. 8, the rotational speeds of the first motor 2, the second motor 3, and the third motor 4 are controlled in such a manner that a speed and a torque of the engine 1 are changed within a hatched range between the line L1 and the line L2. In FIG. 8, the line L1 represents a relation between the engine speed and the vehicle speed of the case in which the vehicle Ve is propelled in a fixed high stage where the speed of the second rotary element 5b connected to the first motor 2 is reduced to zero, and the line L2 represents the relation between the engine speed and the vehicle speed of the case in which the vehicle Ve is propelled in a fixed low stage where the speed of the third rotary element 5c connected to the second motor 3 is reduced to zero. In addition, the line L3 represents the relation between the engine speed and the vehicle speed of the case in which the vehicle Ve is propelled in a direct stage where the first rotary element 5a connected to the engine 1 and the fourth rotary element 5d connected to the output unit 7 are rotated at a same speed.

Here, it is to be noted that steps S11 and S30 may also be executed simultaneously or integrated.

Thus, according to the third control example, the controller 11 also controls the first motor 2, the second motor 3, and the third motor 4 in such a manner as to generate torques in the same direction as the engine torque, during propulsion in the hybrid mode or when launching the vehicle Ve in the hybrid mode. In addition, the controller 11 controls the rotational speeds of the first motor 2, the second motor 3, and the third motor 4 in such a manner as to operate all of those motors 2, 3, and 4 as motors.

As described, in the vehicle Ve, the engine 1, the first motor 2, the second motor 3, and the output unit 7 are connected to the differential mechanism 5 (i.e., the power split device). In the vehicle Ve, therefore, when the first motor 2 or the second motor 3 is operated as a generator, resultant electricity is supplied to the third motor 4 and consumed by the third motor 4. In this situation, an electric power required to drive the third motor 4 (i.e., a drive power) is determined based on a total value of the electric power generated by the first motor 2 and the second motor 3, and a battery power. If the drive power exceeds an available output power of the third motor 4, the buttery power would be redundant. In order to solve such disadvantage, the controller 11 operates all of the first motor 2, the second motor 3, and the third motor 4 as motors. For this reason, the battery power may be utilized efficiently by reducing a generation power of each of the first motor 2 and the second motor 3 to zero, when assisting the drive force by the motor torques. Consequently, energy efficiency of the vehicle Ve can be improved.

Fourth Control Example

Figure 9:
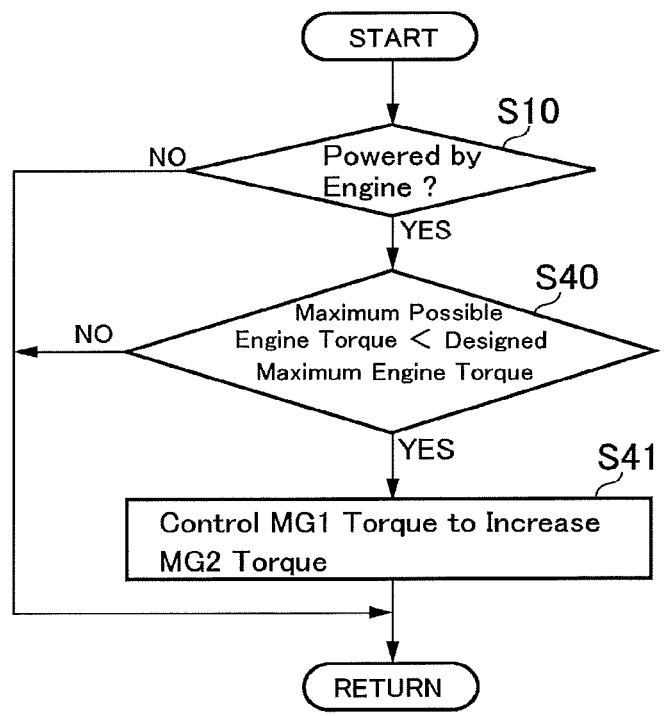
FIG. 9 is a flowchart showing a fourth example of a routine executed by the control system.

As shown in FIG. 9, the controller 11 is further configured to control one of the first motor 2 and the second motor 3 in such a manner as to increase an output torque of the other one of the first motor 2 and the second motor 3, when a current upper limit value of the output torque of the engine 1 is smaller than a designed maximum torque. In FIG. 9, common step number is allotted to the step in common with that of the foregoing examples.

According to the fourth control example, if the vehicle Ve is propelled or launched by the engine 1 so that the answer of step S10 is YES, the routine progresses to step S40 to determine whether or not a current maximum torque of the engine 1 is smaller than the designed maximum torque of the engine 1.

If the current maximum torque of the engine 1 is not smaller than the designed maximum torque of the engine 1, that is, if the engine 1 is in a condition possible to generate the designed maximum torque so that the answer of step S40 is NO, the routine returns without carrying out the subsequent controls. In this case, it is unnecessary to assist the drive force by the torques of the first motor 2, the second motor 3, and the third motor 4. By contrast, if the current maximum torque of the engine 1 is smaller than the designed maximum torque of the engine 1 so that the answer of step S40 is YES, the routine progresses to step S41.

At step S41, one of the first motor 2 and the second motor 3 is controlled in such a manner as to increase an output torque of the other one of the first motor 2 and the second motor 3. According to the fourth control example, specifically, a torque of the first motor 2 is controlled in such a manner as to increase an output torque of the second motor 3. Thereafter, the routine returns.

Thus, when the current upper limit torque of the engine 1 is smaller than the designed maximum torque, the controller 11 controls one of the first motor 2 and the second motor 3 connected to the differential mechanism 5 in such a manner as to increase the output torque of the other motor. For this reason, the drive force to propel the vehicle Ve can be assisted efficiently by the torques of the first motor 2 and the second motor 3 even when the output torque of the engine 1 is restricted.

Fifth Control Example

Figure 10:
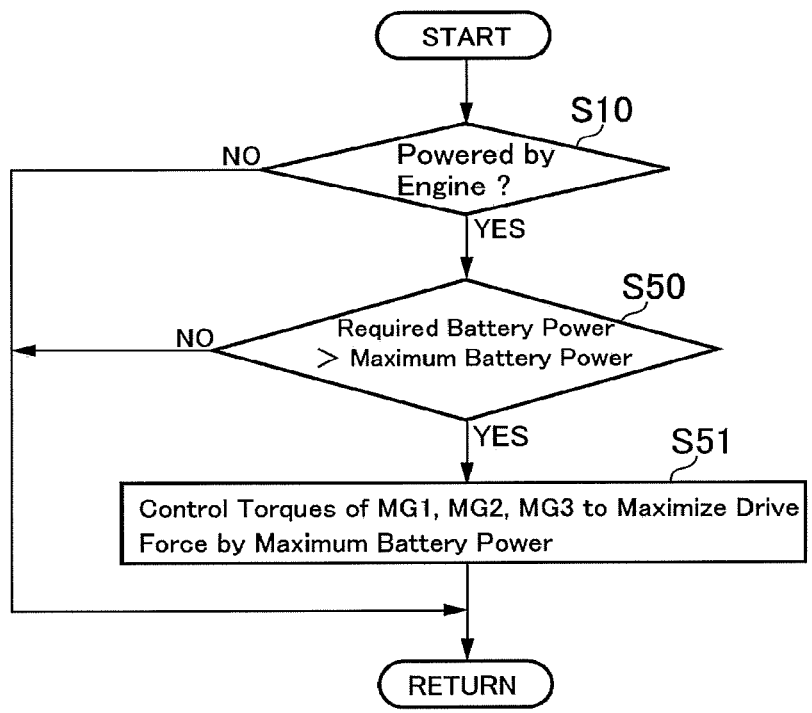
FIG. 10 is a flowchart showing a fifth example of a routine executed by the control system.

As shown in FIG. 10, the controller 11 is further configured to control the first motor 2 the second motor 3, and the third motor 4 in such a manner as to maximize a total force of: the drive force generated by the torque delivered from the fourth rotary element 5*d* of the differential mechanism 5 to the output unit 7; and the drive force generated by the torque delivered from the third motor 4 to the output unit 7. In FIG. 10, common step number is allotted to the step in common with that of the foregoing examples.

According to the fifth example, if the vehicle Ve is propelled or launched by the engine 1 so that the answer of step S10 is YES, the routine progresses to step S50 to determine whether or not a required battery power is greater than a maximum battery power. Specifically, the required battery power is a power required to supply electricity to the first motor 2, the second motor 3, and the third motor 4 to generate motor torques so as to achieve the required drive force together with the engine torque. For example, the required battery power may be calculated based on a current vehicle speed, an engine speed, and a required drive force. On the other hand, the maximum battery power is a maximum possible output of the battery under the current SOC level.

If the required battery power is smaller than the maximum battery power so that the answer of step S50 is NO, the routine returns without carrying out the subsequent controls. In this case, the maximum drive force can be generated by operating the first motor 2, the second motor 3, and the third motor 4 without carrying out any specific control. By contrast, if the required battery power is greater than the maximum battery power so that the answer of step S50 is YES, the routine progresses to step S51.

At step S51, the first motor 2, the second motor 3, and the third motor 4 are controlled in such a manner as to increase the drive force to propel the vehicle Ve within the current maximum possible output of the battery. Specifically, at least any one of the first motor 2 and the second motor 3 connected to the differential mechanism 5 connected to the engine 1 is controlled in such a manner as to maximize the engine torque. For example, a torque and a speed of the first motor 2 are adjusted in such a manner as to maximize the engine torque. Instead, a torque and a speed of the second motor 3 may also be adjusted in such a manner as to maximize the engine torque. Further, the torques and the speeds of the first motor 2 and the second motor 3 may also be adjusted in such a manner as to maximize the engine torque. Consequently, the drive force established by the torque delivered from the fourth rotary element 5*d* of the differential mechanism 5 to the output unit 7 is maximized. In other words, the drive force established by a synthesized torque of the torque of the engine 1 and the torques of the first motor 2 and the second motor 3 is maximized.

Thereafter, a torque and a speed of the third motor 4 are controlled in such a manner as to utilize the current maximum possible output of the battery as much as possible. Specifically, the third motor 4 is controlled in such a manner as to generate a maximum possible output by the remaining battery power after maximizing the engine torque. Consequently, the drive force established by the torque delivered from the third motor 4 to the output unit 7 is maximized.

As a result of thus controlling the first motor 2, the second motor 3, and the third motor 4, the total force of: the drive force established by the torque delivered from the fourth rotary element 5*d* of the differential mechanism 5 to the output unit 7; and the drive force established by the torque delivered from the third motor 4 to the output unit 7 can be maximized.

After thus controlling the first motor 2, the second motor 3, and the third motor 4 at step S51, the routine returns.

Figure 11:
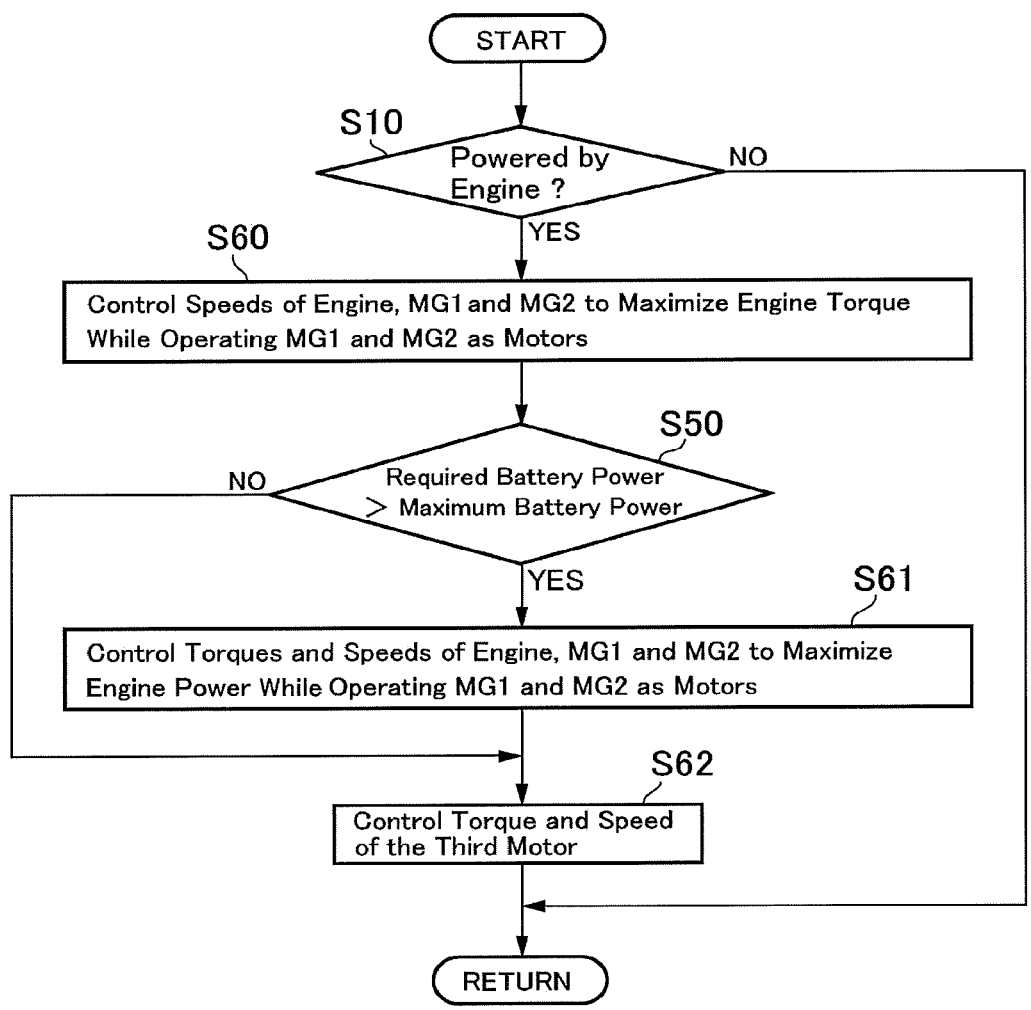
FIG. 11 is a flowchart showing a sixth example of a routine executed by the control system.

[Sixth control example] FIG. 11 shows a modification example of the routine shown in FIG. 10. According to the sixth example shown in FIG. 11, the first motor 2, the second motor 3, and the third motor 4 are also controlled in such a manner as to maximize a total force of: the drive force established by the torque delivered from the fourth rotary element 5d of the differential mechanism 5 to the output unit 7; and the drive force established by the torque delivered from the third motor 4 to the output unit 7. In FIG. 11, common step numbers are allotted to the steps in common with those of the foregoing examples.

Figure 12:
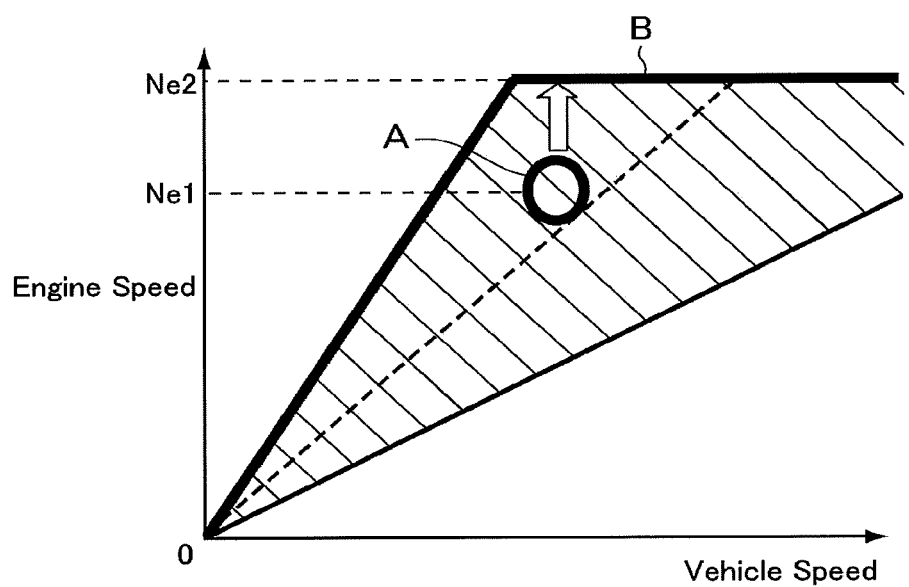
FIG. 12 is a graph showing a region where the engine speed and the vehicle speed are changed, and an operating point of the engine during execution of the routine shown in FIG. 11.
Figure 13:
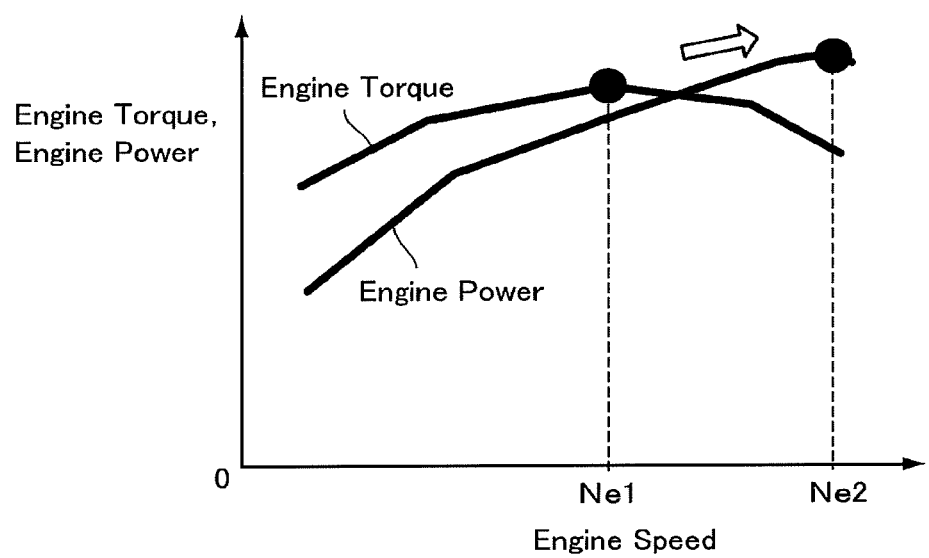
FIG. 13 is a graph showing a peak of an engine torque and an engine power during execution of the routine shown in FIG. 11.
Figure 14:
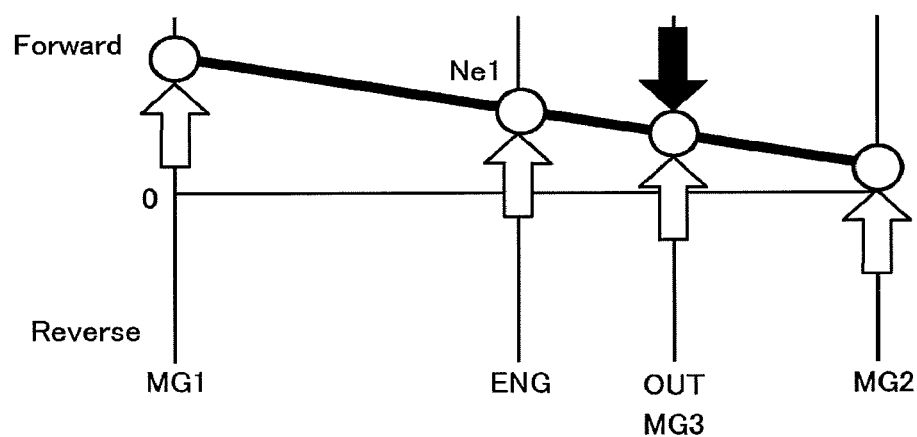
FIG. 14 is a nomographic diagram showing a situation in which all of the motors are controlled to increase the engine torque to the maximum torque during execution of the routine shown in FIG. 11.

According to the sixth example, if the vehicle Ve is propelled or launched by the engine 1 so that the answer of step S10 is YES, the routine progresses to step S60 to control speeds of the engine 1, the first motor 2 and the second motor 3 in such a manner as to maximize the engine torque by operating the first motor 2 and the second motor 3 as motors. For example, the operating points of the engine 1, the first motor 2 and the second motor 3 are set in such a manner as to maximize the engine torque while adjusting the engine speed to a speed Ne1 falling within a circle A shown in FIG. 12. The maximum engine torque and speeds of the prime movers in this situation are schematically indicated in FIGS. 13 and 14.

Thereafter, it is determined at step S50 to determine whether or not the required battery power is greater than the maximum battery power. If the required battery power is greater than the maximum battery power so that the answer of step S50 is YES, the routine progresses to step S61.

Figure 15:
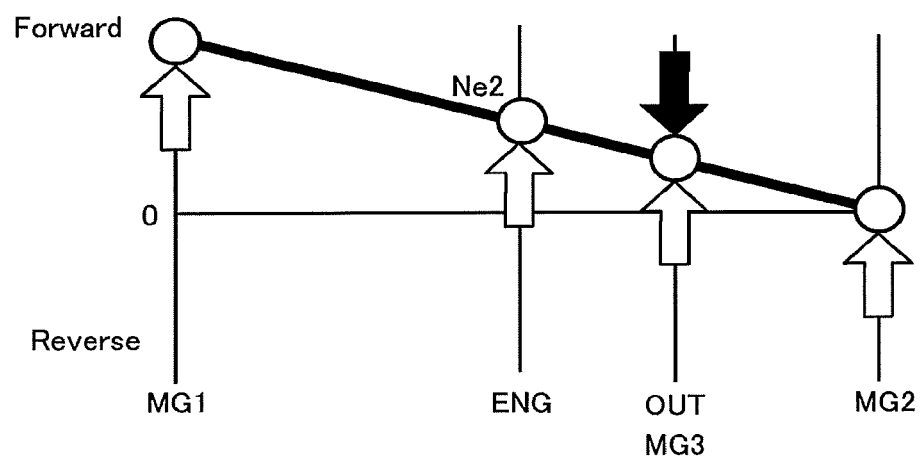
FIG. 15 is a nomographic diagram showing a situation in which all of the motors are controlled to increase the engine power to the maximum power during execution of the routine shown in FIG. 11.

At step S61, a speed of the engine 1, and speeds and torques of the first motor 2 and the second motor 3 are controlled in such a manner as to maximize the engine torque by operating the first motor 2 and the second motor 3 as motors. Specifically, the operating points of the engine 1, the first motor 2 and the second motor 3 are set in such a manner as to maximize the engine torque while adjusting the engine speed to a speed Ne2 falling within a range indicated by the line B shown in FIG. 12. The maximum engine power and speeds of the prime movers in this situation are schematically indicated in FIGS. 13 and 15.

In the case that the routine progresses to step S61, the required battery power is greater than the maximum battery power. That is, the required drive force cannot be established only by the torque of the first motor 2 and the second motor 3. At step S61, both of the first motor 2 and the second motor 3 are operated as motors to generate torques, and the engine 1 is controlled in such a manner as to generate the maximum power. Consequently, the drive force established by the torque delivered from the fourth rotary element 5d of the differential mechanism 5 to the output unit 7 is maximized. In other words, the drive force established by the synthesized torque of the torque of the engine 1 and the torques of the first motor 2 and the second motor 3 is maximized.

Thereafter, at step S62, a torque and a speed of the third motor 4 are controlled in such a manner as to utilize the current maximum possible output of the battery as much as possible. Specifically, the third motor 4 is controlled in such a manner as to generate a maximum possible output by the remaining battery power after maximizing the engine torque. Consequently, the drive force established by the torque delivered from the third motor 4 to the output unit 7 is maximized.

By contrast, if the required battery power is smaller than the maximum battery power so that the answer of step S50 is NO, the routine skips step S61 and progresses to step S62. In this case, the required battery power can be outputted from the battery, and hence the maximum drive force can be generated by controlling the first motor 2, the second motor 3, and the third motor 4 in accordance with the required battery power. Consequently, the drive force established by the torque delivered from the third motor 4 to the output unit 7 is maximized.

As a result of thus controlling the first motor 2, the second motor 3, and the third motor 4, the total force of: the drive force established by the torque delivered from the fourth rotary element 5d of the differential mechanism 5 to the output unit 7; and the drive force established by the torque delivered from the third motor 4 to the output unit 7 can be maximized.

After thus controlling the first motor 2, the second motor 3, and the third motor 4 at steps S61 and S62, the routine returns.

Thus, when the required battery power is greater than the maximum battery power, the first motor 2 the second motor 3, and the third motor 4 are controlled in such a manner as to maximize the total force of: the drive force established by the torque delivered from the differential mechanism 5 to the drive wheels 6; and the drive force established by the torque delivered from the third motor 4 to the drive wheels 6.

In the vehicle Ve, the torque delivered from the differential mechanism 5 to the output unit 7 is governed by the torques of the first motor 2 and the second motor 3 connected to the differential mechanism 5 and a gear ratio of the differential mechanism 5. As described, the vehicle Ve is propelled by the total force of: the drive force established by the torque delivered from the differential mechanism 5 to the drive wheels 6 through the output unit 7; and the drive force established by the torque delivered from the third motor 4 to the drive wheels 6 through the output unit 7. When the SOC level of the battery is sufficiently high, the above-mentioned total drive force can be maximized by the torques of the first motor 2, the second motor 3, and the third motor 4. In this case, therefore, a power balance among the first motor 2, the second motor 3, and the third motor 4 may be maintained substantially stable while establishing the maximum drive force. By contrast, in the case that the required battery power is greater than the maximum battery power, the electricity supplied to the motors is restricted, and consequently the power balance among the first motor 2, the second motor 3, and the third motor 4 will be changed. However, the controller 11 is configured to control the first motor 2, the second motor 3, and the third motor 4 in such a manner as to maximize the total force of: the drive force established by the torque delivered from the differential mechanism 5 to the drive wheels 6; and the drive force established by the torque delivered from the third motor 4 to the drive wheels 6. Consequently, the power balance among the first motor 2, the second motor 3, and the third motor 4 are optimized. For this reason, the drive force can be maximized as much as possible utilizing the limited battery power.

The control system according to the embodiment may also be applied to hybrid vehicles having different kinds of the gear trains shown in FIGS. 16 to 25. In FIGS. 16 to 25, common reference numerals are allotted to the elements in common with those in the gear train shown in FIG. 2, and detailed explanation for those common elements will be omitted.

Figure 16:
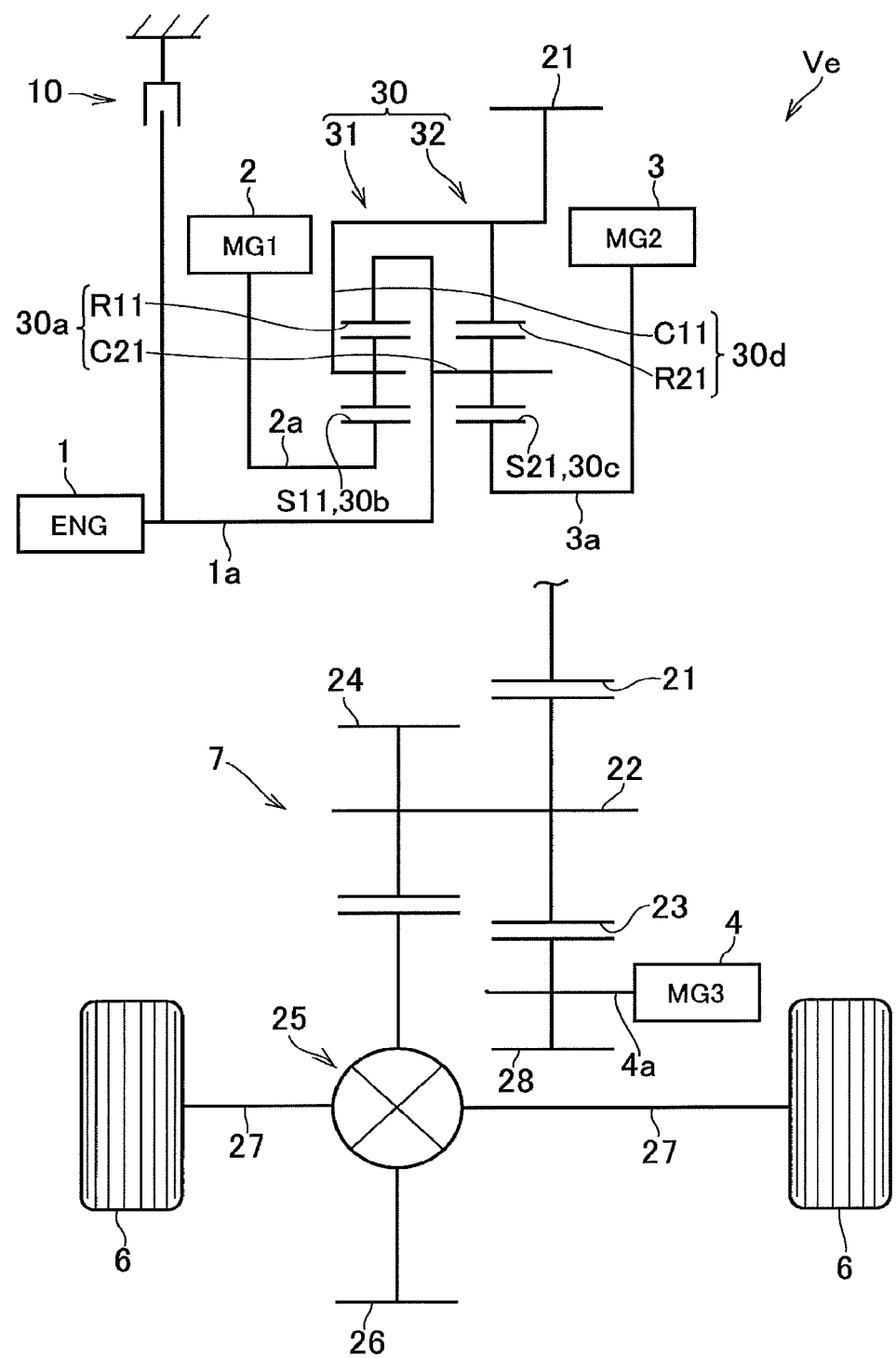
FIG. 16 is a schematic illustration showing a second example of the gear train of the hybrid vehicle.

FIG. 16 shows the second example of the gear train of the vehicle Ve. In the vehicle Ve shown in FIG. 16, the prime mover also includes the engine 1, the first motor 2, the second motor 3, and the third motor 4. The vehicle Ve shown in FIG. 16 further comprises a differential mechanism 30 serving as a power split device. The differential mechanism 30 is also a complex planetary gear unit including a single-pinion first planetary gear unit 31 and a single-pinion second planetary gear unit 32 connected to each other. The differential mechanism 30 includes a first rotary element 30a to which the engine 1 is connected, a second rotary element 30b to which the first motor 2 is connected, a third rotary element 30c to which the second motor 3 is connected, and a fourth rotary element 30d to which the output unit 7 is connected.

The first planetary gear unit 31 includes a first sun gear S11, a first ring gear R11, and a first carrier C11. Likewise, the second planetary gear unit 32 includes a second sun gear S21, a second ring gear R21, and a second carrier C21. The first ring gear R11 and the second carrier C21 are connected to each other, and the first carrier C11 and the second ring gear R21 are connected to each other.

In the differential mechanism 30, the first ring gear R11 and the second carrier C21 are connected to the output shaft 1a of the engine 1, the first sun gear S11 is connected to the output shaft 2a of the first motor 2, the second sun gear S21 is connected to the output shaft 3a of the second motor 3, and the first carrier C11 and the second ring gear R21 are connected to the output unit 7.

In the differential mechanism 30, accordingly, the first ring gear R11 and the second carrier C21 serve as the first rotary element 30a, the first sun gear S11 serves as the second rotary element 30b, the second sun gear S21 serves as the third rotary element 30c, and the first carrier C11 and the second ring gear R21 serve as the fourth rotary element 30d.

Figure 17:
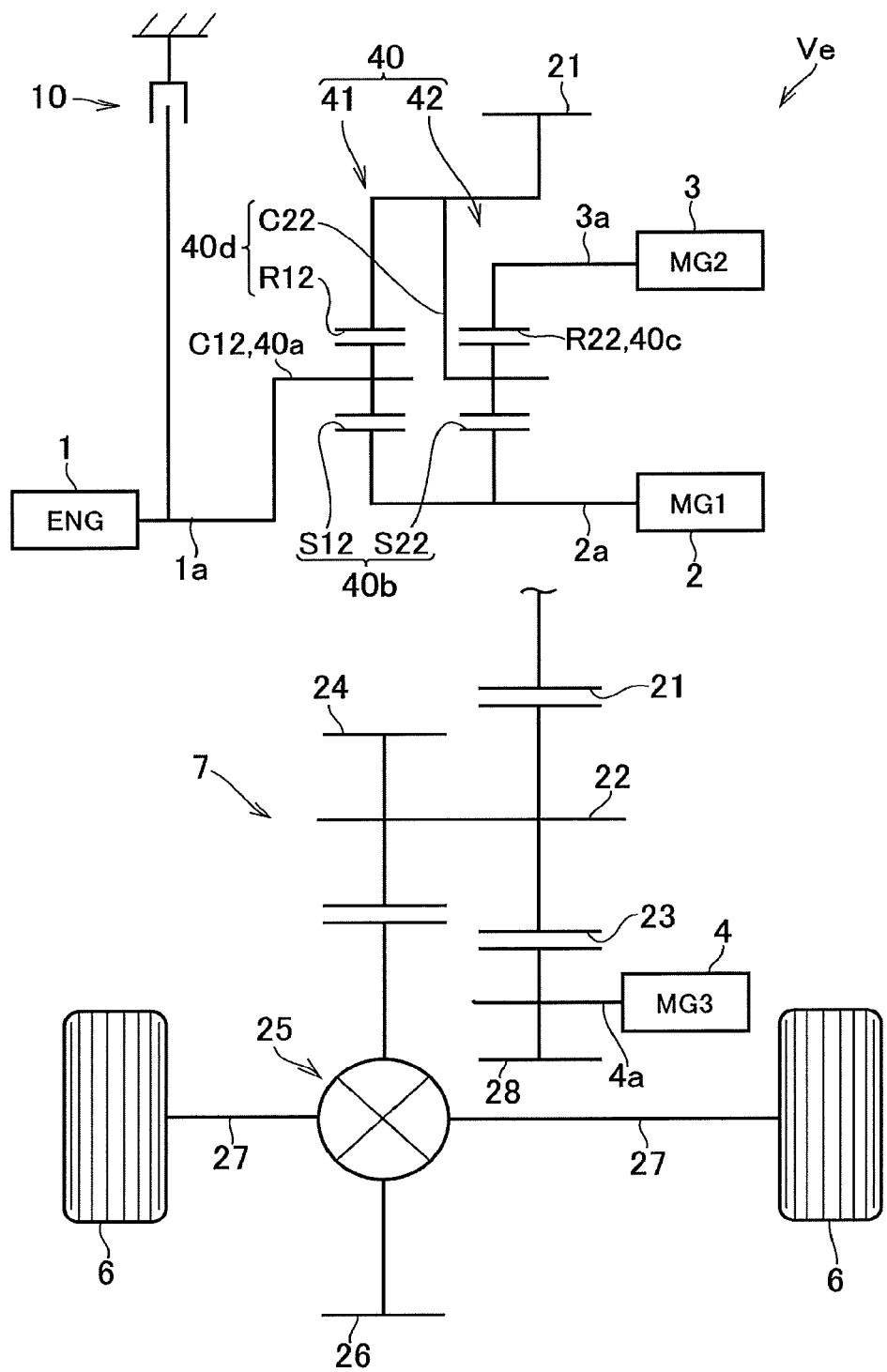
FIG. 17 is a schematic illustration showing a third example of the gear train of the hybrid vehicle.

FIG. 17 shows the third example of the gear train of the vehicle Ve. In the vehicle Ve shown in FIG. 17, the prime mover also includes the engine 1, the first motor 2, the second motor 3, and the third motor 4. The vehicle Ve shown in FIG. 17 further comprises a differential mechanism 40 serving as a power split device. The differential mechanism 40 is also a complex planetary gear unit including a single-pinion first planetary gear unit 41 and a single-pinion second planetary gear unit 42 connected to each other. The differential mechanism 40 includes a first rotary element 40a to which the engine 1 is connected, a second rotary element 40b to which the first motor 2 is connected, a third rotary element 40c to which the second motor 3 is connected, and a fourth rotary element 40d to which the output unit 7 is connected.

The first planetary gear unit 41 includes a first sun gear S12, a first ring gear R12, and a first carrier C12. Likewise, the second planetary gear unit 42 includes a second sun gear S22, a second ring gear R22, and a second carrier C22. The first sun gear S12 and the second sun gear S22 are connected to each other, and the first ring gear R12 and second carrier C22 are connected to each other.

In the differential mechanism 40, the first carrier C12 is connected to the output shaft 1a of the engine 1, the first sun gear S12 and the second sun gear S22 are connected to the output shaft 2a of the first motor 2, the second ring gear R22 is connected to the output shaft 3a of the second motor 3, and the first ring gear R12 and the second carrier C22 are connected to the output unit 7.

In the differential mechanism 40, accordingly, the first carrier C12 serve as the first rotary element 40a, the first sun gear S12 and the second sun gear S22 serve as the second rotary element 40b, the second ring gear R22 serves as the third rotary element 40c, and the first ring gear R12 and the second carrier C22 serve as the fourth rotary element 40d.

Figure 18:
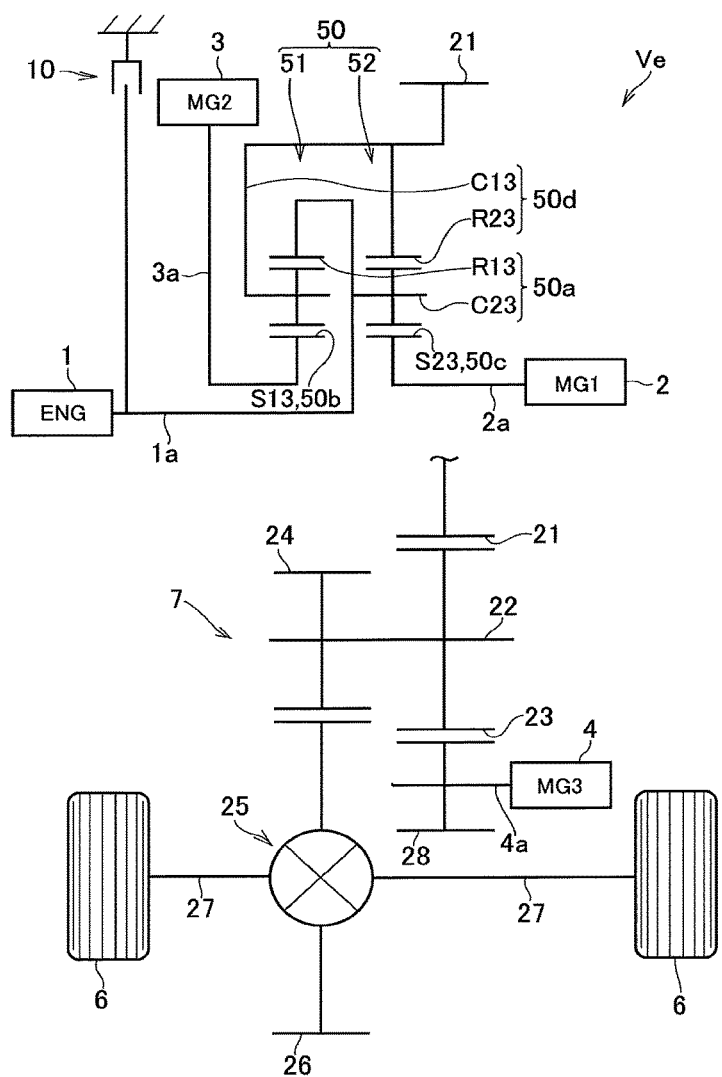
FIG. 18 is a schematic illustration showing a fourth example of the gear train of the hybrid vehicle.

FIG. 18 shows the fourth example of the gear train of the vehicle Ve. In the vehicle Ve shown in FIG. 18, the prime mover also includes the engine 1, the first motor 2, the second motor 3, and the third motor 4. The vehicle Ve shown in FIG. 18 further comprises a differential mechanism 50 serving as a power split device. The differential mechanism 50 is also a complex planetary gear unit including a single-pinion first planetary gear unit 51 and a single-pinion second planetary gear unit 52 connected to each other. The differential mechanism 50 includes a first rotary element 50a to which the engine 1 is connected, a second rotary element 50b to which the first motor 2 is connected, a third rotary element 50c to which the second motor 3 is connected, and a fourth rotary element 50d to which the output unit 7 is connected.

The first planetary gear unit 51 includes a first sun gear S13, a first ring gear R13, and a first carrier C13. Likewise, the second planetary gear unit 52 includes a second sun gear S23, a second ring gear R23, and a second carrier C23. The first ring gear R13 and the second carrier C23 are connected to each other, and the first carrier C13 and the second ring gear R23 are connected to each other.

In the differential mechanism 50, the first ring gear R13 and the second carrier C23 are connected to the output shaft 1a of the engine 1, the first sun gear S13 is connected to the output shaft 3a of the second motor 3, the second sun gear S23 is connected to the output shaft 2a of the first motor 2, and the first carrier C13 and the second ring gear R23 are connected to the output unit 7.

In the differential mechanism 50, accordingly, the first ring gear R13 and the second carrier C23 serve as the first rotary element 50a, the second sun gear S23 serves as the second rotary element 50b, the first sun gear S13 serves as the third rotary element 50c, and the first carrier C13 and the second ring gear R23 serve as the fourth rotary element 50d.

Figure 19:
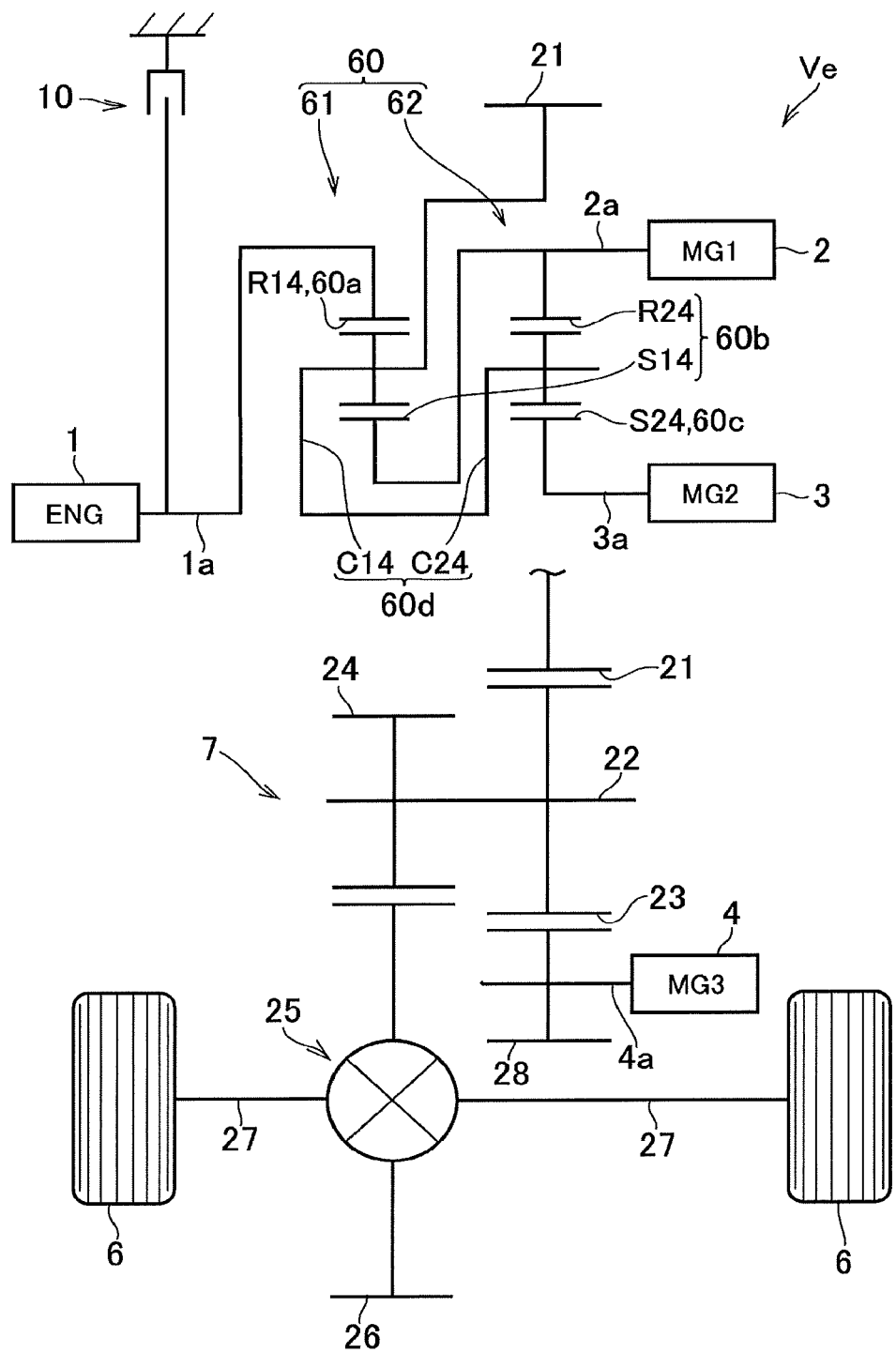
FIG. 19 is a schematic illustration showing a fifth example of the gear train of the hybrid vehicle.

FIG. 19 shows the fifth example of the gear train of the vehicle Ve. In the vehicle Ve shown in FIG. 19, the prime mover also includes the engine 1, the first motor 2, the second motor 3, and the third motor 4. The vehicle Ve shown in FIG. 19 further comprises a differential mechanism 60 serving as a power split device. The differential mechanism 60 is also a complex planetary gear unit including a single-pinion first planetary gear unit 61 and a single-pinion second planetary gear unit 62 connected to each other. The differential mechanism 60 includes a first rotary element 60a to which the engine 1 is connected, a second rotary element 60b to which the first motor 2 is connected, a third rotary element 60c to which the second motor 3 is connected, and a fourth rotary element 60d to which the output unit 7 is connected.

The first planetary gear unit 61 includes a first sun gear S14, a first ring gear R14, and a first carrier C14. Likewise, the second planetary gear unit 62 includes a second sun gear S24, a second ring gear R24, and a second carrier C24. The first sun gear S14 and the second ring gear R24 are connected to each other, and the first carrier C14 and the second carrier C24 are connected to each other.

In the differential mechanism 60, the first ring gear R14 is connected to the output shaft 1a of the engine 1, the first sun gear S14 and the second ring gear R24 are connected to the output shaft 2a of the first motor 2, the second sun gear S24 is connected to the output shaft 3a of the second motor 3, and the first carrier C14 and the second carrier C24 are connected to the output unit 7.

In the differential mechanism 60, accordingly, the first ring gear R14 serves as the first rotary element 60a, the first sun gear S14 and the second ring gear R24 serve as the second rotary element 60b, the second sun gear S24 serves as the third rotary element 60c, and the first carrier C14 and the second carrier C24 serve as the fourth rotary element 60d.

Figure 20:
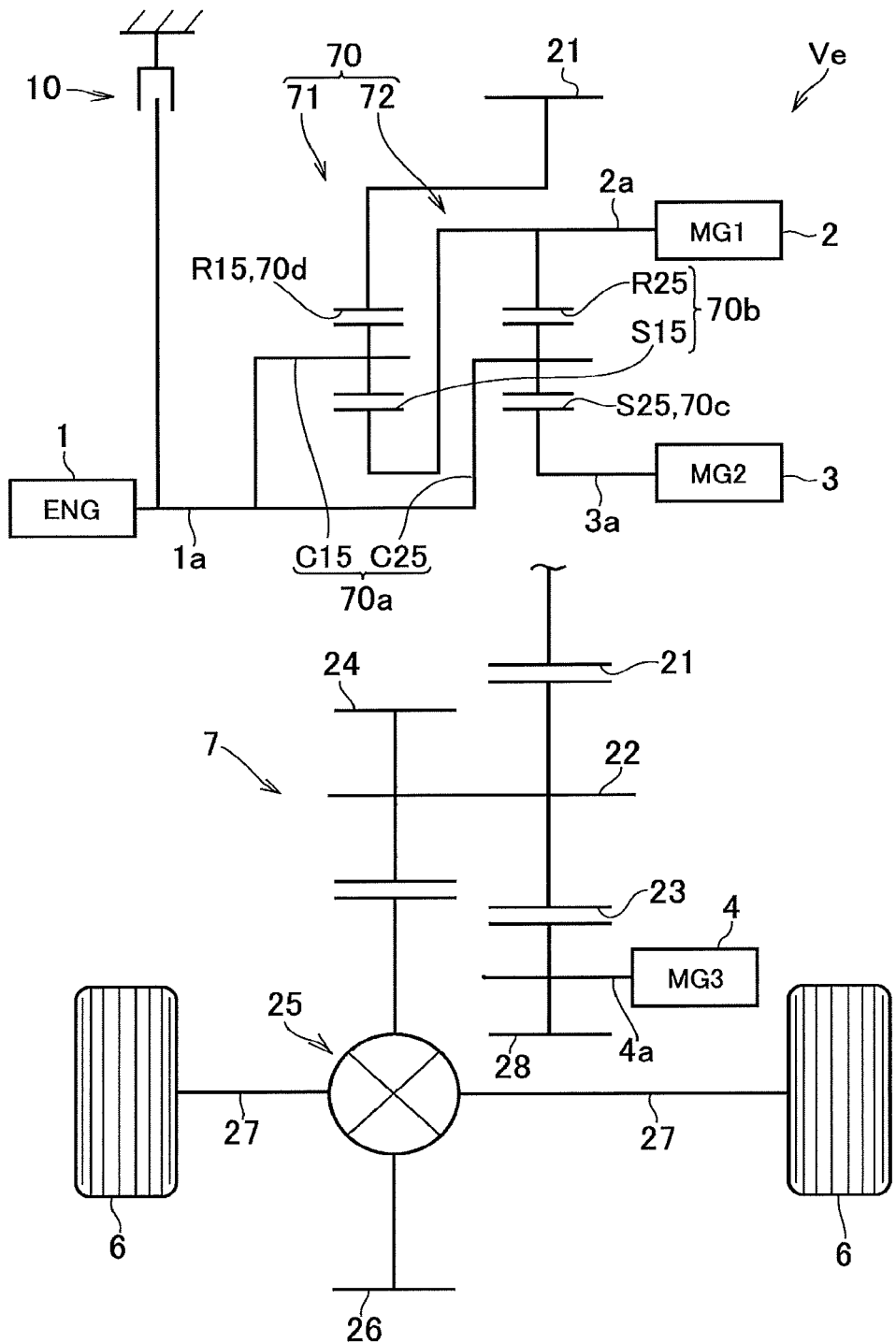
FIG. 20 is a schematic illustration showing a sixth example of the gear train of the hybrid vehicle.

FIG. 20 shows the sixth example of the gear train of the vehicle Ve. In the vehicle Ve shown in FIG. 20, the prime mover also includes the engine 1, the first motor 2, the second motor 3, and the third motor 4. The vehicle Ve shown in FIG. 20 further comprises a differential mechanism 70 serving as a power split device. The differential mechanism 70 is also a complex planetary gear unit including a single-pinion first planetary gear unit 71 and a single-pinion second planetary gear unit 72 connected to each other. The differential mechanism 70 includes a first rotary element 70a to which the engine 1 is connected, a second rotary element 70b to which the first motor 2 is connected, a third rotary element 70c to which the second motor 3 is connected, and a fourth rotary element 70d to which the output unit 7 is connected.

The first planetary gear unit 71 includes a first sun gear S15, a first ring gear R15, and a first carrier C15. Likewise, the second planetary gear unit 72 includes a second sun gear S25, a second ring gear R25, and a second carrier C25. The first carrier C15 and the second carrier C25 are connected to each other, and the first sun gear S15 and the second ring gear R25 are connected to each other.

In the differential mechanism 70, the first carrier C15 and the second carrier C25 are connected to the output shaft 1a of the engine 1, the first sun gear S15 and the second ring gear R25 are connected to the output shaft 2a of the first motor 2, the second sun gear S25 is connected to the output shaft 3a of the second motor 3, and the first ring gear R15 is connected to the output unit 7.

In the differential mechanism 70, accordingly, the first carrier C15 and the second carrier C25 serve as the first rotary element 70a, the first sun gear S15 and the second ring gear R25 serve as the second rotary element 70b, the second sun gear S25 serves as the third rotary element 70c, and the first ring gear R15 serve as the fourth rotary element 70d.

Figure 21:
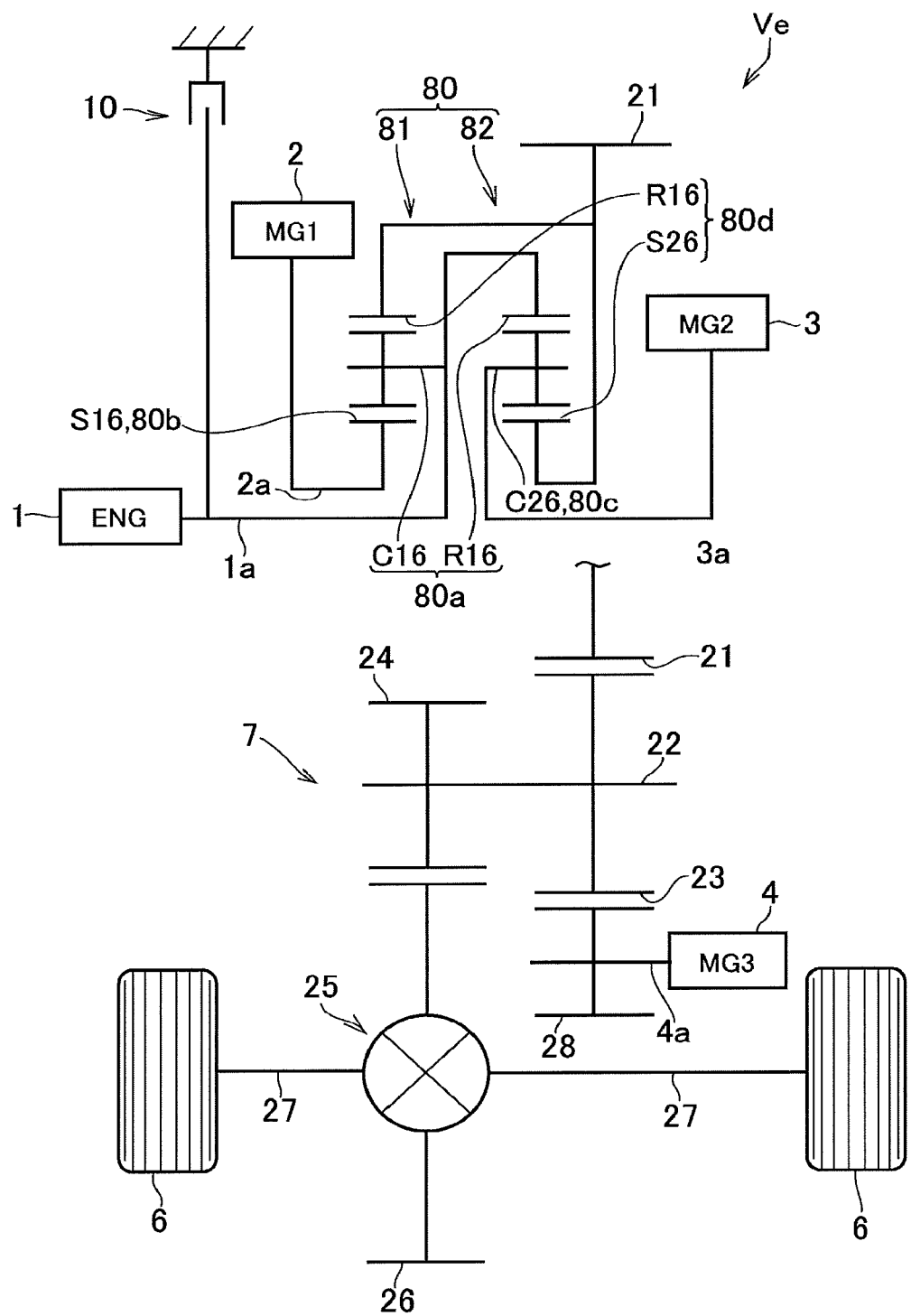
FIG. 21 is a schematic illustration showing a seventh example of the gear train of the hybrid vehicle.

FIG. 21 shows the seventh example of the gear train of the vehicle Ve. In the vehicle Ve shown in FIG. 21, the prime mover also includes the engine 1, the first motor 2, the second motor 3, and the third motor 4. The vehicle Ve shown in FIG. 21 further comprises a differential mechanism 80 serving as a power split device. The differential mechanism 80 is also a complex planetary gear unit including a single-pinion first planetary gear unit 81 and a single-pinion second planetary gear unit 82 connected to each other. The differential mechanism 80 includes a first rotary element 80a to which the engine 1 is connected, a second rotary element 80b to which the first motor 2 is connected, a third rotary element 80c to which the second motor 3 is connected, and a fourth rotary element 80d to which the output unit 7 is connected.

The first planetary gear unit 81 includes a first sun gear S16, a first ring gear R16, and a first carrier C16. Likewise, the second planetary gear unit 82 includes a second sun gear S26, a second ring gear R26, and a second carrier C26. The first carrier C16 and the second ring gear R26 are connected to each other, and the first ring gear R16 and the second sun gear S26 are connected to each other.

In the differential mechanism 80, the first carrier C16 and the second ring gear R26 are connected to the output shaft 1a of the engine 1, the first sun gear S16 is connected to the output shaft 2a of the first motor 2, the second carrier C26 is connected to the output shaft 3a of the second motor 3, and the first ring gear R16 and the second sun gear S26 are connected to the output unit 7.

In the differential mechanism 80, accordingly, the first carrier C16 and the second ring gear R26 serve as the first rotary element 80a, the first sun gear S16 serves as the second rotary element 80b, the second carrier C26 serves as the third rotary element 80c, and the first ring gear R16 and the second sun gear S26 serve as the fourth rotary element 80d.

According to the embodiment of the present disclosure, other kinds of planetary gear units such as a double-pinion planetary gear unit and a Ravigneaux planetary gear unit may also be used as the differential mechanism instead of the single-pinion planetary gear unit.

Figure 22:
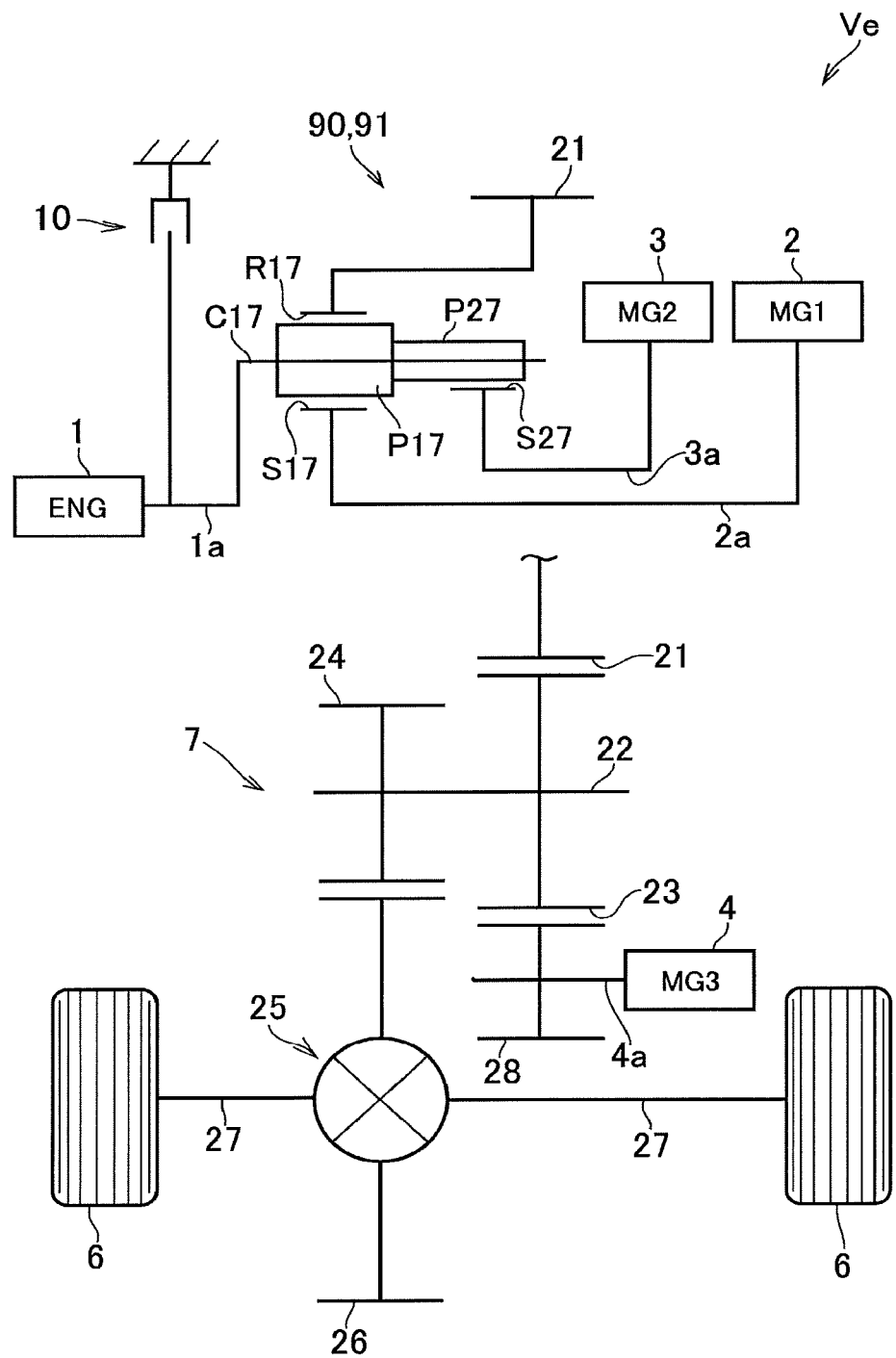
FIG. 22 is a schematic illustration showing an eighth example of the gear train of the hybrid vehicle.

FIG. 22 shows the eighth example of the gear train of the vehicle Ve. In the vehicle Ve shown in FIG. 22, the prime mover also includes the engine 1, the first motor 2, the second motor 3, and the third motor 4. The vehicle Ve shown in FIG. 22 further comprises a differential mechanism 90 serving as a power split device. In the gear train shown in FIG. 22, a Ravigneaux planetary gear unit 91 is used as the differential mechanism 90. The differential mechanism 90 includes a first rotary element 90a to which the engine 1 is connected, a second rotary element 90b to which the first motor 2 is connected, a third rotary element 90c to which the second motor 3 is connected, and a fourth rotary element 90d to which the output unit 7 is connected.

The Ravigneaux planetary gear unit 91 includes a first sun gear S17, a ring gear R17, a carrier C17, and a second sun gear S27. Specifically, Ravigneaux planetary gear unit 91 includes the first sun gear S17, the ring gear R17 arranged around the first sun gear S17, a second sun gear S27 arranged coaxially with the first sun gear S17 while being allowed to rotate relatively thereto, a plurality of short pinion gears P17 meshing with the first sun gear S17 and the ring gear R17, a plurality of long pinion gears P27 individually connected to the short pinion gears P17 while being meshed with the second sun gear S27, and a carrier C17 supporting the short pinion gears P17 and the long pinion gears P27 in a rotatable manner.

In the Ravigneaux planetary gear unit 91, the carrier C17 is connected to the output shaft 1a of the engine 1, the first sun gear S17 is connected to the output shaft 2a of the first motor 2, the second sun gear S27 is connected to the output shaft 3a of the second motor 3, and the ring gear R17 is connected to the output unit 7.

In the differential mechanism 90, accordingly, the carrier C17 serves as the first rotary element 90a, the first sun gear S17 serves as the second rotary element 90b, the second sun gear S27 serves as the third rotary element 90c, and the ring gear R17 serve as the fourth rotary element 90d.

According to the embodiment of the present disclosure, a differential mechanism having five rotary elements may also be used instead of the foregoing differential mechanisms.

Figure 23:
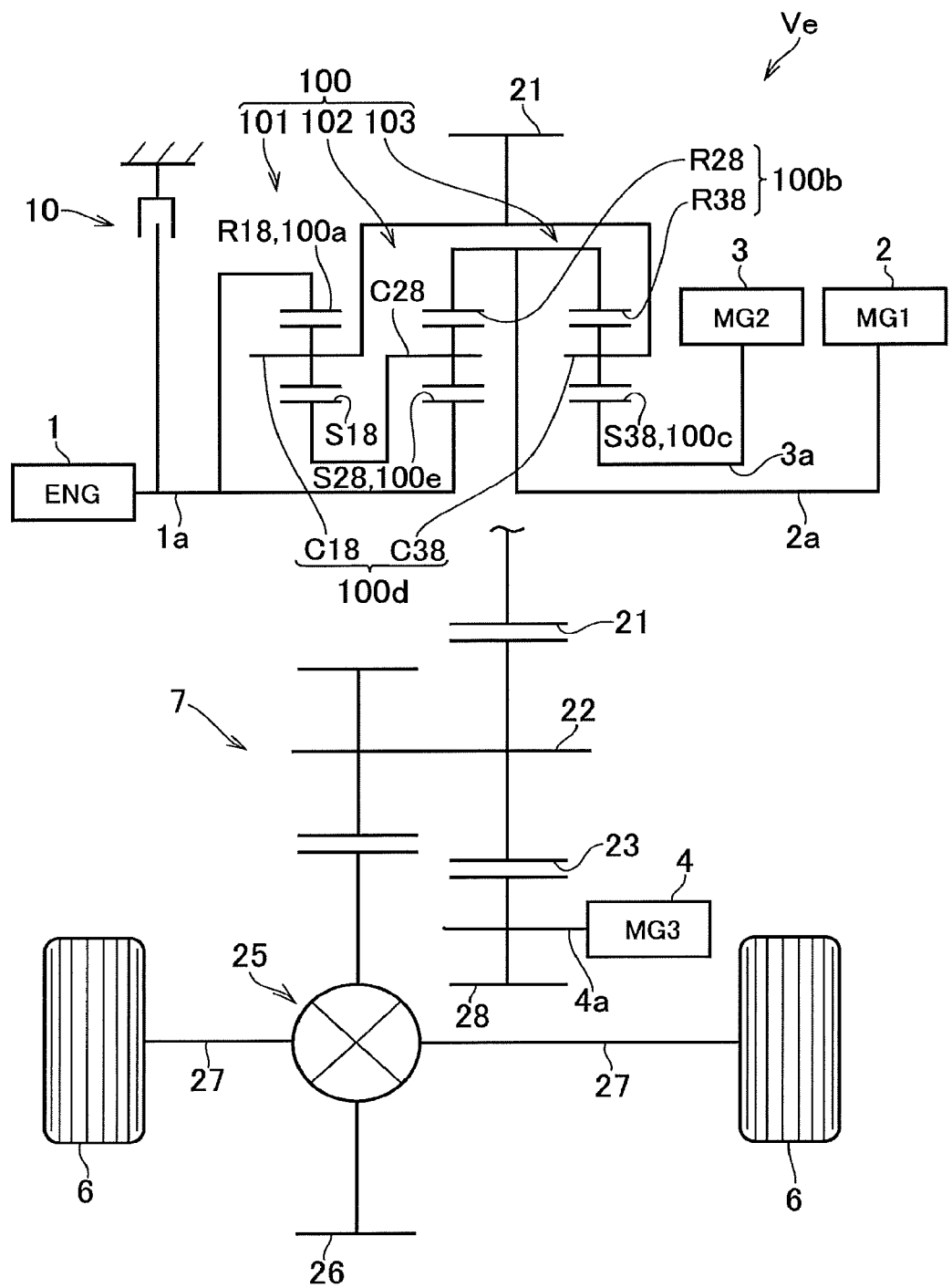
FIG. 23 is a schematic illustration showing a ninth example of the gear train of the hybrid vehicle.

FIG. 23 shows the ninth example of the gear train of the vehicle Ve. In the vehicle Ve shown in FIG. 23, the prime mover also includes the engine 1, the first motor 2, the second motor 3, and the third motor 4. The vehicle Ve shown in FIG. 24 further comprises a differential mechanism 100 serving as a power split device. The differential mechanism 100 is a complex planetary gear unit formed by combining a single-pinion first planetary gear unit 101, a single-pinion second planetary gear unit 102, and a single-pinion third planetary gear unit 103. The differential mechanism 100 includes a first rotary element 100a to which the engine 1 is connected, a second rotary element 100b to which the first motor 2 is connected, a third rotary element 100c to which the second motor 3 is connected, a fourth rotary element 100*d* to which the output unit 7 is connected, and a fifth rotary element 100*e* to which the engine 1 and the first rotary element 100*a* are connected.

The first planetary gear unit 101 includes a first sun gear S18, a first ring gear R18, and a first carrier C18. Likewise, the second planetary gear unit 102 includes a second sun gear S28, a second ring gear R28, and a second carrier C28. Likewise, the third planetary gear unit 103 includes a third sun gear S38, a third ring gear R38, and a third carrier C38. The first sun gear S18 and the second carrier C28 are connected to each other, the first ring gear R18 and the second sun gear S28 are connected to each other, the second ring gear R28 and the third ring gear R38 are connected to each other, and the first carrier C18 and the third carrier C38 are connected to each other.

In the differential mechanism 100, the first ring gear R18 is connected to the output shaft 1*a* of the engine 1, the second ring gear R28 and the third ring gear R38 are connected to the output shaft 2*a* of the first motor 2, the third sun gear S38 is connected to the output shaft 3*a* of the second motor 3; the first carrier C18 and the third carrier C38 are connected to the output unit 7, and the second sun gear S28 and the first ring gear R18 are connected to the output shaft 1*a* of the engine 1.

In the differential mechanism 100, accordingly, the first ring gear R18 serve as the first rotary element 100*a*, the second ring gear R26 and the third ring gear R38 serve as the second rotary element 100*b*, the third sun gear S38 serves as the third rotary element 100*c*, the first carrier C18 and the third carrier C38 serve as the fourth rotary element 100*d*, and the second sun gear S28 serves as the fifth rotary element 100*e*.

According to the embodiment of the present disclosure, each pair of the front wheels and the rear wheels may be equipped individually with the output unit to deliver power to those pairs of wheels.

Figure 24:
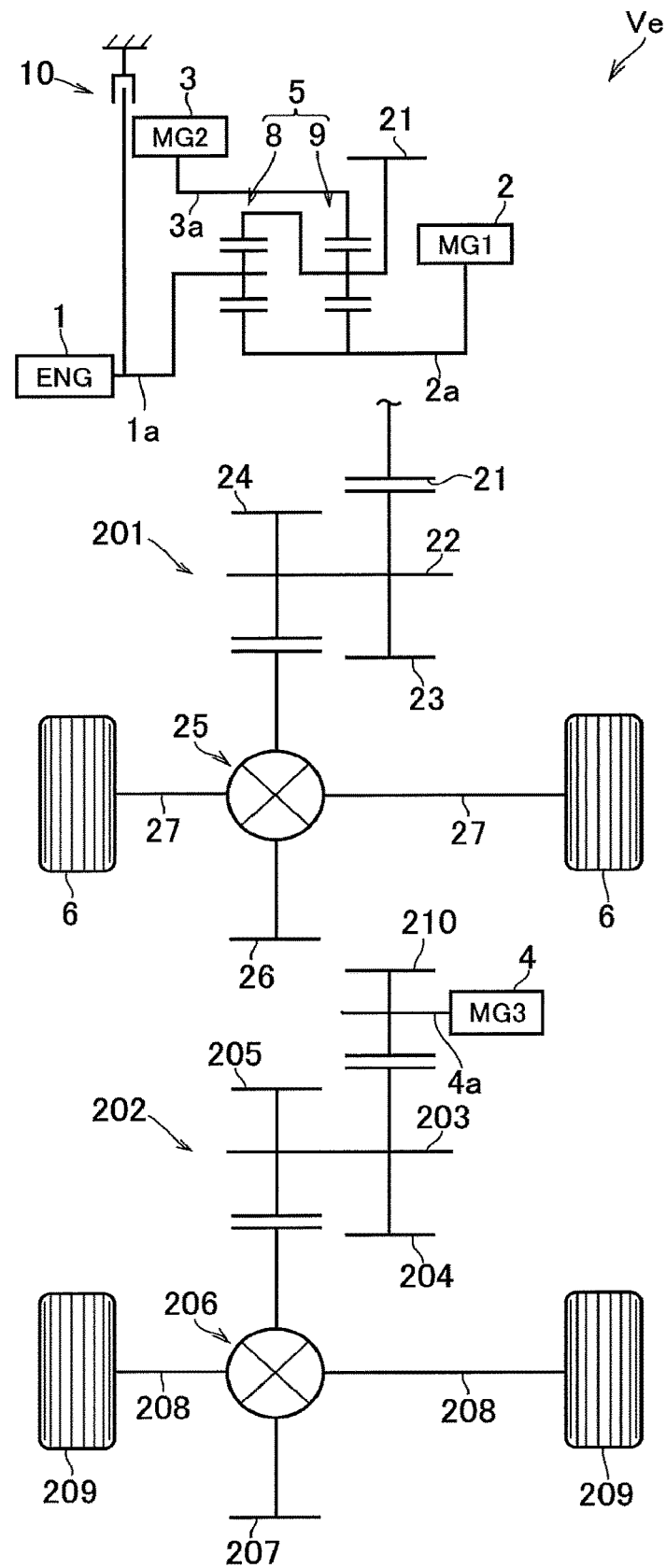
FIG. 24 is a schematic illustration showing a tenth example of the gear train of the hybrid vehicle.

FIG. 24 shows the tenth example of the gear train of the vehicle Ve in which the front wheels serve as the drive wheels 6. In the vehicle Ve shown in FIG. 24, the prime mover also includes the engine 1, the first motor 2, the second motor 3, and the third motor 4. The vehicle Ve shown in FIG. 24 further comprises a first output unit 201 and a second output unit 202.

The first output unit 201 includes the drive gear 21, the countershaft 22, the counter driven gear 23, the final drive gear 24, and the differential gear unit 25. The drive gear 21 is rotated integrally with the second carrier C2 of the differential mechanism 5. That is, the first output unit 201 is connected to the fourth rotary element 5*d* of the differential mechanism 5 to deliver power to the drive wheels 6. In the gear train shown in FIG. 24, the third motor 4 is not connected to the first output unit 201 but connected to the second output unit 202.

The second output unit 202 includes a countershaft 203, a counter driven gear 204, a final drive gear 205, and a differential gear unit 206. The counter driven gear 204 is fitted onto one of end portions of the countershaft 203 (i.e., in the right side in FIG. 24) and the final drive gear 205 is fitted onto the other end portion of the countershaft 203 (i.e., in the left side in FIG. 24) while being meshed with the final driven gear 207 of the differential gear unit 206. The differential gear unit 206 is connected to each of drive wheels 209 through each of driveshafts 208.

Torque of the third motor 4 may be applied to the drive wheels 209. To this end, the output shaft 4*a* of the third motor 4 is arranged parallel to the countershaft 203, and a pinion 210 is fitted onto a leading end (i.e., in the left side in FIG. 24) of the output shaft 4*a* while being meshed with the counter driven gear 204. That is, the third motor 4 is connected to the drive wheels 209 through the second output unit 202 so as to deliver torque to the drive wheels 209 through the driveshafts 208.

According to the embodiment of the present disclosure, the control system may also be applied to a vehicle in which the prime mover includes an engine and four motors.

Figure 25:
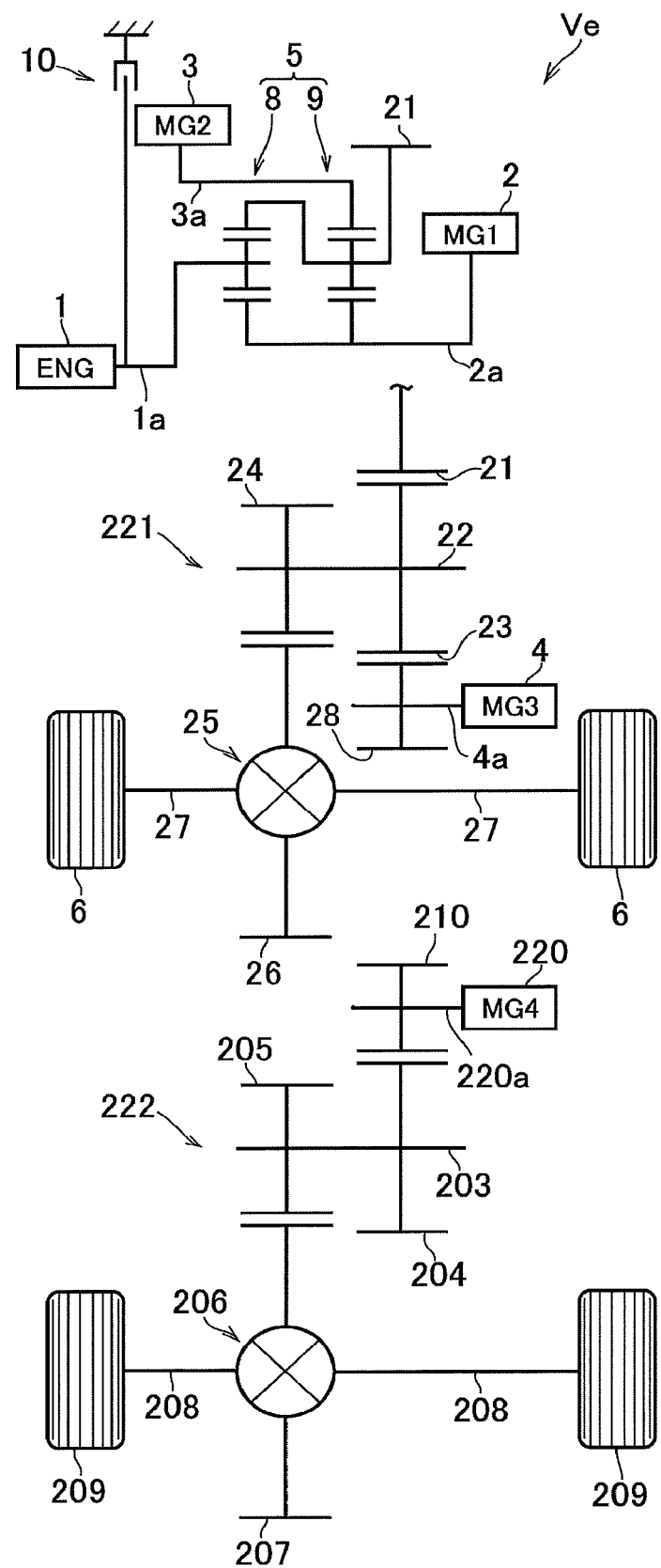
FIG. 25 is a schematic illustration showing an eleventh example of the gear train of the hybrid vehicle.

FIG. 25 shows the eleventh example of the gear train of the vehicle Ve. In the vehicle Ve shown in FIG. 25, the prime mover includes the engine 1, the first motor 2, the second motor 3, the third motor 4 and a fourth motor (referred to as "MG4" in FIG. 25) 220. The vehicle Ve shown in FIG. 23 further comprises a first output unit 221 and a second output unit 222.

A structure of the first output unit 221 is similar to that of the output unit 7. That is, the first output unit 221 is connected to the fourth rotary element 5*d* of the differential mechanism 5 to deliver power to the drive wheels 6. In the gear train shown in FIG. 25, the third motor 4 is connected to the first output unit 221 to deliver torque to the front wheels serving as the drive wheels 6.

A structure of the second output unit 222 is similar to that of the second output unit 202. The fourth motor 220 is connected to the second output unit 222 to deliver torque to the rear wheels serving as the drive wheels 209 through the driveshafts 208.

Although the above exemplary embodiment of the present disclosure has been described, it will be understood by those skilled in the art that the present application should not be limited to the described exemplary embodiment, and various changes and modifications can be made within the spirit and scope of the present disclosure.

What is claimed is:

1. A control system for a hybrid vehicle, comprising:
    a prime mover including an engine and at least three motors;
    a differential mechanism that performs a differential rotation among at least four rotary elements;
    an output unit that delivers power to drive wheels; and
    a controller that controls the prime mover,
    wherein the engine is connected to a first rotary element of the differential mechanism,
    a first motor of the prime mover is connected to a second rotary element of the differential mechanism,
    a second motor of the prime mover is connected to a third rotary element of the differential mechanism,
    the output unit is connected to a fourth rotary element of the differential mechanism, and
    a third motor of the prime mover is connected to the output unit that is connected to the fourth rotary element or another output unit that is not connected to the fourth rotary element, and
    the controller is configured to
        determine an operating condition of the hybrid vehicle, and
        control the first motor and the second motor in such a manner as to generate torques in a same direction as a torque of the engine to propel the hybrid vehicle in a forward direction, and
        control the third motor in such a manner as to generate a torque in the forward direction to propel the vehicle together with the torque of the engine, when the controller determines that the hybrid vehicle is propelled by the torque of the engine.

2. The control system for a hybrid vehicle as claimed in claim 1, wherein the controller is further configured to:

compare a required drive force to propel the hybrid vehicle with a threshold value; and control the first motor and the second motor in such a manner as to generate the torques in the same direction as the torque of the engine to propel the vehicle in the forward direction, and control the third motor in such a manner as to generate the torque in the forward direction to propel the vehicle together with the torque of the engine, when the required drive force is greater than the threshold value.

3. The control system for a hybrid vehicle as claimed in claim 1, wherein the controller is further configured to:

control the first motor in such a manner as to generate a torque in the same direction as the torque of the engine to rotate the second rotary element, and control the second motor in such a manner as to generate a torque in the same direction as the torque of the engine to rotate the third rotary element;

control the first motor in such a manner as to generate a torque to rotate the second rotary element in the same direction as the torque of the engine, and control the second motor in such a manner as to generate a forward torque in the same direction as the torque of the engine to brake the third rotary element; or control the second motor in such a manner as to generate a torque in the same direction as the torque of the engine to rotate the third rotary element, and control the first motor in such a manner as to generate a forward torque in the same direction as the torque of the engine to brake the second rotary element, when generating the torques by the first motor and the second motor in the same direction as a torque of the engine to propel the hybrid vehicle in a forward direction.

4. The control system for a hybrid vehicle as claimed in claim 1, wherein the controller is further configured to control the first motor, the second motor, and the third motor in such a manner as to serve individually as a motor.

5. The control system for a hybrid vehicle as claimed in claim 1, wherein the controller is further configured to:

compare a current upper limit value of the torque possible to be generated by the engine with a designed maximum torque of the engine; and control one of the first motor and the second motor in such a manner as to increase an output torque of the other one of the first motor and the second motor, when the upper limit value of the torque generated by the engine is smaller than the designed maximum torque of the engine.

6. The control system for a hybrid vehicle as claimed in claim 1, wherein the controller is further configured to control the first motor, the second motor, and the third motor in such a manner as to maximize a total force of:

a drive force generated by the torque delivered from the fourth rotary element to the output unit; and a drive force generated by the torque delivered from the third motor to the output unit.

7. The control system for a hybrid vehicle as claimed in claim 1, wherein the differential mechanism includes: a first planetary gear unit including a first sun gear, a first carrier, and a first ring gear; and a second planetary gear unit including a second sun gear, a second carrier, and a second ring gear, the first sun gear and the second sun gear are connected to each other, the first ring gear and the second carrier are connected to each other, the first carrier is connected to the engine to serve as the first rotary element, the first sun gear or the second sun gear is connected to the first motor to serve as the second rotary element, the second ring gear is connected to the second motor to serve as the third rotary element, and the first ring gear or the second carrier is connected to the output unit to serve as the fourth rotary element.

8. The control system for a hybrid vehicle as claimed in claim 1, wherein the differential mechanism includes: a first planetary gear unit including a first sun gear, a first carrier, and a first ring gear; and a second planetary gear unit including a second sun gear, a second carrier, and a second ring gear, the first carrier and the second ring gear are connected to each other, the first ring gear and the second carrier are connected to each other, the first ring gear or the second carrier is connected to the engine to serve as the first rotary element, the first sun gear is connected to the first motor to serve as the second rotary element, the second sun gear is connected to the second motor to serve as the third rotary element, and the first carrier or the second ring gear is connected to the output unit to serve as the fourth rotary element.

* * * * *